United States Patent
Liu et al.

(10) Patent No.: US 9,588,635 B2
(45) Date of Patent: Mar. 7, 2017

(54) MULTI-MODAL CONTENT CONSUMPTION MODEL

(71) Applicant: Microsoft Corporation, Redmond, WA (US)

(72) Inventors: Zhen Liu, Tarrytown, NY (US); Chien Chih (Jacky) Hsu, Beijing (CN); Jing-Yeu Jaw, Beijing (CN); Chen (Howard) Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 445 days.

(21) Appl. No.: 14/104,771

(22) Filed: Dec. 12, 2013

(65) Prior Publication Data
US 2015/0169138 A1    Jun. 18, 2015

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/017* (2013.01); *G06F 3/0488* (2013.01);
(Continued)

(58) Field of Classification Search
CPC .................................. G06F 3/00; G06F 3/048
(Continued)

(56) References Cited

U.S. PATENT DOCUMENTS 6,014,135 A * 1/2000 Fernandes ............. G06F 3/0481
                                                709/203
7,003,515 B1 * 2/2006 Glaser ............... G06F 17/30743
                                                707/723
(Continued)

FOREIGN PATENT DOCUMENTS

WO        03051051 A1      6/2003

OTHER PUBLICATIONS

International Search Report and Written Opinion issued in PCT Patent Application No. PCT/US2014/068974, Mail Date: Mar. 23, 2015, 9 Pages.

(Continued)

*Primary Examiner* — David Phantana Angkool
(74) *Attorney, Agent, or Firm* — Aneesh Mehta; Kate Drakos; Micky Minhas

(57) ABSTRACT

Methods, systems, and computer program products are provided that enable users to interact with displayed content. An extensible user interface (UI) model framework is provided that enables a user device to provide multiple content feedback mechanisms at the same time, such as touch, non-touch, motion, gestures, voice, etc. A user is enabled to choose a most comfortable way for the user to interact with the displayed content using the user device, and an indication of the interaction may be sent to a content provider. The content provider may provide next content for display based on the received feedback. The user device may enable the user to use one or more feedback mechanisms at any time, including a combination of feedback mechanisms. Addi- (Continued)

tional interaction modules can be plugged in to enable any number of additional ways of interacting with displayed content on the user device.

20 Claims, 18 Drawing Sheets

(51) Int. Cl.
*G06F 3/01* (2006.01)
*G06F 3/0484* (2013.01)
*G06F 3/0488* (2013.01)
*G06F 3/16* (2006.01)
*G06Q 50/00* (2012.01)

(52) U.S. Cl.
CPC .......... *G06F 3/04842* (2013.01); *G06F 3/167* (2013.01); *G06Q 50/01* (2013.01)

(58) Field of Classification Search
USPC ........................................................ 715/763
See application file for complete search history.

(56) References Cited

U.S. PATENT DOCUMENTS

| | | | | |
|---|---|---|---|---|
| 7,072,943 | B2* | 7/2006 | Landesmann | G06Q 20/10 705/39 |
| 7,127,232 | B2* | 10/2006 | O'Neil | H04L 12/1403 455/408 |
| 7,730,216 | B1* | 6/2010 | Issa | H04L 67/104 709/214 |
| 7,805,129 | B1* | 9/2010 | Issa | H04N 21/41407 370/310 |
| 8,494,858 | B2 | 7/2013 | Cross, Jr. et al. | |
| 9,060,034 | B2* | 6/2015 | Black | G06Q 10/107 |
| 9,164,993 | B2* | 10/2015 | Svendsen | G06F 17/30017 |
| 9,224,427 | B2* | 12/2015 | Black | G11B 27/28 |
| 9,280,789 | B2* | 3/2016 | Kirkham | G06Q 30/0631 |
| 9,369,514 | B2* | 6/2016 | Bernhardsson | H04L 67/02 |
| 2002/0160757 | A1* | 10/2002 | Shavit | H04M 3/42382 455/414.1 |
| 2003/0069874 | A1* | 4/2003 | Hertzog | G06Q 10/109 |
| 2004/0119761 | A1* | 6/2004 | Grossman | G06Q 10/10 715/854 |
| 2005/0022239 | A1* | 1/2005 | Meuleman | G06F 17/30035 725/46 |
| 2006/0136222 | A1 | 6/2006 | Cross et al. | |

OTHER PUBLICATIONS

"Gentle User Interfaces for Elderly People", Retrieved on: Aug. 12, 2013, Available at: <http://www.guide-project.eu/includes/requestFile.php?id=118&pub=2>, 4 pages.

Maat, et al., "Gaze-X: Adaptive, Affective, Multimodal Interface for Single-User Office Scenarios", In Artifical Intelligence for Human Computing, Jan. 6, 2007, 21 pages.

Schaefer, et al., "Dialog Modelling for Multiple Devices and Multiple Interaction Modalities", In Proceedings of the 5th International Conference on Task Models and Diagrams for Users Interface Design, Oct. 23, 2006, 8 pages.

Saigal, Aparajit, "Sees—An Adaptive Multimodal User Interface for the Visually Impaired", Published on: May 2007, Available at: <http://citeseerx.ist.psu.edu/viewdoc/download?doi=10.1.1.118.4258&rep=rep1&type=pdf>, 100 pages.

Second Written Opinion Issued in PCT Application No. PCT/US2014/068974, Mailed Date: Aug. 13, 2015, 7 Pages.

"International Preliminary Report on Patentability Issued in PCT Application No. PCT/US2014/068974", Mailed Date: Feb. 1, 2016, 7 Pages.

* cited by examiner

MULTI-MODAL CONTENT CONSUMPTION MODEL

BACKGROUND

Today, users consume a great amount of content that is accessible on networks such as the Internet via browsers and other applications. Examples of such content include images, text, videos, etc. Frequently, when content is displayed on a display screen in the form of a page (e.g., on a webpage), multiple content items may be displayed together in the page, with each content item occupying a portion of the screen.

Users that view such content may desire to provide feedback. Techniques exist for obtaining feedback on content from users at a page/screen level. For example, content providers sometimes use techniques such as a like/dislike button, a feedback/survey form, or a comments submission box to obtain user feedback on a current page/screen. Generally, a fixed number of the feedback techniques is available on a particular device for a user to use to provide feedback.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable users to interact with displayed content. An extensible user interface (UI) model framework is provided that enables a user device to provide multiple content feedback mechanisms at the same time, such as touch, non-touch, motion, gestures, voice, etc. A user is enabled to choose a most comfortable way for the user to interact with the displayed content using the user device, and an indication of the interaction may be sent to a content provider by the extensible UI model framework. The content provider may provide next content for display based on the received feedback. The user device may enable the user to use one or more feedback mechanisms at any time, including a combination of feedback mechanisms. Additional interaction modules can be plugged in to the extensible UI model framework to enable any number of additional ways of interacting with displayed content on the user device.

The users may be enabled to interact with the displayed content to indicate various preferences. Such preferences may include indicating that they do not prefer the content (e.g., "No"), that they prefer the content and would like additional similar content to be provided (e.g., "More"), and/or that they prefer the content and want more information about the displayed content to be provided (e.g., "Deep"). In the first case, replacement content may be provided and displayed. In the second case, additional content that is similar to the displayed content may be provided and displayed. In the third case, additional content providing additional information about the displayed content may be provided and displayed. The replacement/additional content may be displayed in place of the displayed content, or may be otherwise displayed.

For instance, in one implementation, a user device is provided that includes an extensible user interface (UI) module. The extensible UI module includes an interaction module manager that includes an interaction module interface, a registration interface, and a messaging module. The interaction module interface is configured to couple with a plurality of interaction modules. Each coupled interaction module is configured to enable a corresponding content interaction technique, to receive an interaction signal from corresponding hardware, to translate the interaction signal to a user feedback indication, and to provide the user feedback indication to the interaction module manager according to a common message format. The registration interface is configured to enable the interaction modules to each register with the interaction module manager. The messaging module is configured to generate a user data package for each user feedback indication to transmit to a server.

An interaction module coupled to interaction module interface is configured to enable content feedback to be provided in association with content displayed by the user device. The interaction module is configured to enable a first preference to be indicated that the displayed content is not preferred and that replacement content be displayed, to enable a second preference to be indicated that the displayed content is preferred and that additional content similar to the displayed content be displayed, and to enable a third preference to be indicated that the displayed content is preferred and that additional content providing additional information about the displayed content be displayed.

The interaction module may be a non-touch interaction module, a touch interaction module, a gesture interaction module, a motion sensing interaction module, a voice interaction module, or another type of interaction module.

In another implementation, a method in a user device is provided. An interaction module interface is provided that enables a plurality of interaction modules to couple with an interaction module manager. Each coupled interaction module configured to enable a corresponding content interaction technique, to receive an interaction signal from corresponding hardware, to translate the interaction signal to a user feedback indication, and to provide the user feedback indication through the interaction module interface according to a common message format. The interaction modules are each enabled to register with the interaction module manager. A user data package is generated for each user feedback indication to transmit to a server.

A computer readable storage medium is also disclosed herein having computer program instructions stored therein that enable users to provide feedback on displayed content, and that enable next content to be selected based on the feedback, according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
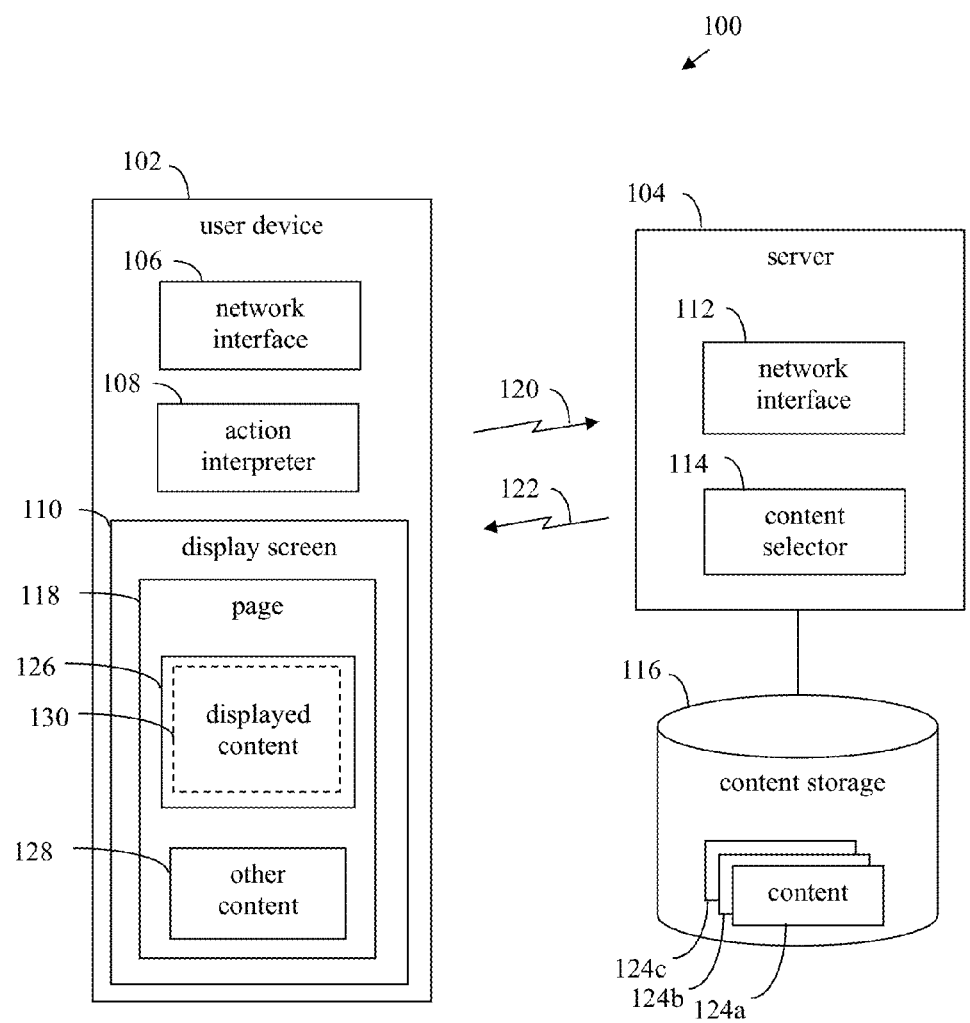
FIG. 1 shows a block diagram of a communication system in which a server device communicates with a user device to provide new content to the user device in response to feedback from a user interacting with displayed content at the user device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Today, users consume a great amount of content that is accessible on networks such as the Internet. Examples of such content include images, text, videos, etc. Frequently, when content is displayed on a display screen in the form of a page (e.g., on a webpage), multiple content items may be displayed together in the page, with each content item occupying a portion of the screen. Users that view such content may desire to provide feedback on the displayed content. Current techniques for obtaining feedback on content from users tend to obtain feedback at a page/screen level. For example, techniques such as a like/dislike button, a feedback/survey form, or a comments submission box may be present to obtain user feedback on a current page/screen. Cookies are also used to collect telemetry from users, and to infer the preferences of users. Pre-defined links may also be present that a user can click on to proceed to content displayed on different content pages.

However, intuitive and straightforward techniques do not tend to exist for allowing a user, as a consumer, to express their preference on a specific content item within a page/screen. Furthermore, techniques do not exist for allowing users to change specific content displayed in a portion of a screen to some other content.

For instance, feedback mechanisms provided at the page/screen level, such as the like/dislike buttons, feedback/comment forms, cookies, etc., do not provide a break-down to the content level accuracy easily. When users click on a URL (uniform resource locator) link or advance an application to a next screen, there is no knowledge regarding the preference of the user about the previously displayed content. For example, whether the user clicked to leave a page does not indicate whether the user liked or disliked the content on the page just left. Furthermore, users typically have to finish reading an entire page/screen before leaving the page/screen for a next page/screen. The user cannot change a portion of the displayed page/screen immediately, without leaving.

Still further, current devices that are available tend to provide one or just a few interaction techniques for an end user. As such, the user may not always be able to choose their most comfortable way to express feedback on content, because their favored technique may not be available. Furthermore, current devices allow few, if any, combinations of interaction techniques. For instance, for particular content, a user device may enable feedback to be provided by one of a virtual keyboard on a touch screen, a virtual keyboard based on hand movement, etc., but not necessarily a combination of such techniques.

Because of this, current user devices are not easily extended to greater numbers of interaction techniques. Furthermore, such interaction techniques, when multiple are available, tend to be independent from each other, and thus cannot be used simultaneously for a particular device. Still further, for disabled persons, it may not be easy to enable an accessibility tool to interact with a user device.

Embodiments are described herein that overcome these limitations. For instance, embodiments are described that enable a user to provide feedback at the content level using configurable techniques. An extensible user interface (UI) model framework is provided that enables a user device to provide multiple content interaction mechanisms at the same time. One or more additional interaction modules can be plugged in to the extensible UI model framework to enable further ways of interacting with displayed content on the user device. As such, a user is enabled to choose a most comfortable way to interact with the displayed content using the user device, and an indication of the interaction may be sent to a content provider by the extensible UI model framework.

The feedback provided by the user may cause the specific content item to be replaced with different content. The different content may be selected based on whether the user feedback indicated the user did not prefer the displayed content item ("No"), indicated the user did prefer the displayed content item and wanted to be displayed similar content ("More"), or that the user did prefer the displayed content item and wanted to be displayed more detailed information regarding the displayed content item ("Deep"). The different content may be displayed in place of the displayed content item, or may be otherwise displayed.

Accordingly, in an embodiment, a new UI model is presented that allows users to obtain preferred content through interactions with content providers. For instance, a user may be enabled to quickly obtain desired content by indicating their request through selecting content in the form of text (e.g., keywords, sentences, or paragraphs), images, and/or another form of content from a content provider. With regard to the content, the user may be able to indicate one or more of: "No"—replace this type of content with new (and a possibly different type of) content; "More"—the user likes this type of content and would like to get more relevant content regarding the same (e.g., different photos or news clips of the same topic); and "Deep"—the user likes this content and wants deeper or more detailed information on the content, and/or wants to incur more actions on the current content item. For example, if content item is an advertisement, the selection by the user of "Deep" may indicate purchase behavior (e.g., the user may be interested in purchasing something related to the content item). In another example, if the content item is a news clip, the selection by the user of "Deep" might trigger a feedback input, or the display of full coverage of the news of the news clip.

Example embodiments are described in the following subsections, including embodiments for enabling users to provide feedback directly on displayed content, for selecting and displaying next content based on the feedback, and for exemplary feedback mechanisms.

A. Example Content Consumption System Embodiments

Embodiments may be implemented in devices and servers in various ways. For instance, FIG. 1 shows a block diagram of a communication system 100 in which a server 104 communicates with a user device 102 to provide selected content for display at user device 102 in response to user feedback on content displayed at user device 102, according to an example embodiment. As shown in FIG. 1, user device 102 includes a network interface 106, an action interpreter 108, and a display screen 110. Server 104 includes a network interface 112 and a content selector 114. Server 104 includes or is coupled to a content storage 116. User device 102 and server 104 are described in further detail as follows.

User device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a RIM Blackberry® device, etc.), a wearable computing device (e.g., a smart watch, smart glasses such as Google® Glass™, etc.), or other type of mobile device (e.g., an automobile), or a stationary computing device such as a desktop computer or PC (personal computer). Server 104 may be implemented in one or more computer systems (e.g., servers), and may be mobile (e.g., handheld) or stationary. Server 104 may be considered a "cloud-based" server, may be included in a private or other network, or may be considered network accessible in another way.

As shown in FIG. 1, content storage 116 includes content, such as first-third content 124a-124c. Each item of stored content may be any type of content, such as textual content (a word, a phrase, a sentence, a paragraph, a document, etc.) or image content (e.g., an image or photo, a video, etc.). Each item of stored content may contain any form of content, such as an advertisement, a news item, etc. Content storage 116 may include one or more of any type of storage mechanism to store content in the form of files or other form, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Network interface 112 of server 104 enables server 104 to communicate over one or more networks, and network interface 106 of user device 102 enables user device 102 to communicate over one or more networks. Examples of such networks include a local area network (LAN), a wide area network (WAN), a personal area network (PAN), or a combination of communication networks, such as the Internet. Network interfaces 106 and 114 may each include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

Display screen 110 of user device 102 may be any type of display screen, such as an LCD (liquid crystal display) screen, an LED (light emitting diode) screen such as an organic LED screen, a plasma display screen, or other type of display screen. Display screen 110 may be integrated in a single housing of user device 102, or may be a standalone display. As shown in FIG. 1, display screen 110 may be used to display content at user device 102. For instance, a user of user device 102 may interact with a user interface of user device 102 to browse content, and cause content to be displayed by display screen 110. For instance, content may be displayed by display screen 110 contained in a page 118, such as a web page rendered by a web browser, or content may be displayed in other form by another application. As shown in FIG. 1, display screen 110 may display displayed content 126 and other content 128. Displayed content 126 and other content 128 may each include one or more content items in the form of textual content or image content. In the example of FIG. 1, displayed content 126 is configured to be able to be interacted with by a user of user device 102 to provide feedback on displayed content 126, according to an embodiment. For example, as shown in FIG. 1, displayed content 126 may include a feedback interface 130 that enables a user to provide feedback on displayed content 126, such as by mouse clicks (e.g., to a displayed pop up menu, one or more virtual buttons, etc.), by touching display screen 110, by motion sensing, by speech recognition, and/or by other user interface interaction. Other content 128 may optionally be present, and may also be configured to be interacted with by a user to provide feedback thereon, or may not be configured to provide feedback.

Action interpreter 108 is configured to interpret the feedback of the user provided to displayed content 126 using feedback interface 130. For example, as described elsewhere herein, the user may provide feedback to displayed content 126 in the form of not preferring displayed content 126 (e.g., not wanting to view displayed content 126, but wanting to display alternative content instead), referred to herein as a feedback selection of "No"; preferring displayed content 126 and wanting to view additional similar content, referred to herein as a feedback selection of "More"; and preferring displayed content 126 and wanting to view additional content that is more descriptive of displayed content 126, referred to herein as a feedback selection of "Deep". Action interpreter 108 is configured to receive the feedback provided to feedback interface 130 by the user, and provide the feedback to network interface 106 to be transmitted to server 104.

Figure 2:
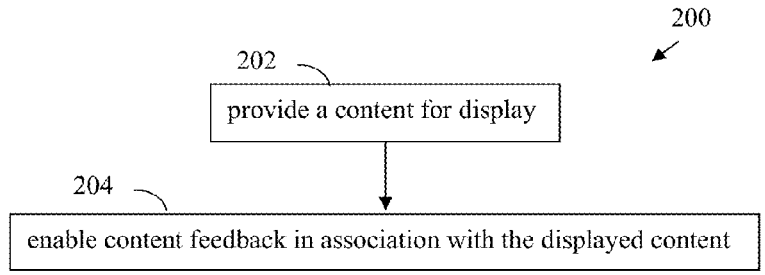
FIG. 2 shows a flowchart providing a process enabling a user to provide feedback directly on displayed content at a user device, according to an example embodiment.

As such, in an embodiment, user device 102 may operate according to FIG. 2. FIG. 2 shows a flowchart 200 providing a process that enables a user to provide feedback directly on displayed content at a user device, according to an example embodiment. Flowchart 200 is described as follows. Further structural and operational embodiments will be apparent to persons skilled in the relevant art(s) based on the following description.

Flowchart 200 begins with step 202. In step 202, content is provided for display. For instance, as shown in FIG. 1, display screen 110 of user device 102 may display displayed content 126, and optionally may display further content such as other content 128. Such content may be displayed in page 118 or in other form.

In step 204, content feedback is enabled in association with the displayed content. For instance, as described above, user device 102 may provide feedback interface 130 in association with displayed content 126 to enable a user of user device 102 to provide feedback on displayed content 126. Such feedback may be received by action interpreter 108.

Figure 3:
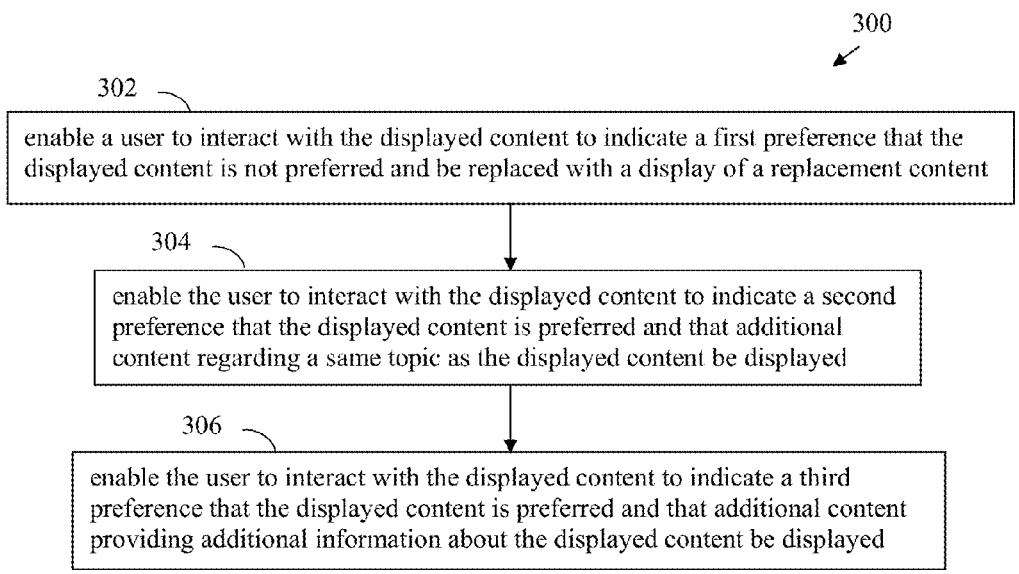
FIG. 3 shows a flowchart providing a process in which a user can indicate various preferences with respect to displayed content, according to an example embodiment.

FIG. 3 shows a flowchart 300 providing a process in which a user can indicate various preferences with respect to displayed content, according to an example embodiment. For instance, flowchart 300 may be performed as an example of step 204 of flowchart 200 in FIG. 2. Flowchart 300 is described as follows. Further structural and operational embodiments will be apparent to persons skilled in the relevant art(s) based on the following description.

Flowchart 300 begins with step 302. In step 302, a user is enabled to interact with the displayed content to indicate a first preference that the displayed content is not preferred and be replaced with a display of a replacement content. For example, as described above with respect to FIG. 1, the user of user device 102 may be enabled to interact with feedback interface 130 to indicate the "No" preference with respect to displayed content 126.

In step 304, the user is enabled to interact with the displayed content to indicate a second preference that the displayed content is preferred and that additional content regarding a same topic as the displayed content be displayed. For example, as described above, the user of user device 102 may be enabled to interact with feedback interface 130 to indicate the "More" preference with respect to displayed content 126.

In step 306, the user is enabled to interact with the displayed content to indicate a third preference that the displayed content is preferred and that additional content providing additional information about the displayed content be displayed. For example, as described above, the user of user device 102 may be enabled to interact with feedback interface 130 to indicate the "Deep" preference with respect to displayed content 126.

Figure 4:
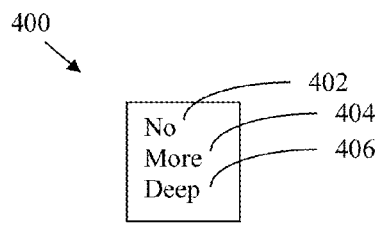
FIG. 4 shows an example graphical user interface element that enables a user to indicate various preferences with respect to displayed content, according to an embodiment.

As described above, feedback interface 130 may be configured to enable the user to provide their feedback in any suitable form, including by one or more of mouse clicks, touch, motion, voice, etc. For instance, FIG. 4 shows an example graphical user interface (GUI) element 400 that enables a user to indicate various preferences with respect to displayed content, according to an embodiment. As shown in FIG. 4, GUI element 400 may be a list or a pop up menu that is present when a user interacts with displayed content 126 of FIG. 1. For instance, when the user hovers a mouse pointer over displayed content 126, touches displayed content 126 on display screen 110, makes a particular predetermined hand motion, speaks a predetermined one or more words, or interacts with displayed content 126 via feedback interface 130 in another way, GUI element 400 may be displayed adjacent to or over displayed content 126 in display screen 110. The user may then provide a subsequent action, such as a click, a touch, a motion, or a speaking of the appropriate word, to indicate their feedback of one of "No", "More", or "Deep" (or other suitable labels provided in GUI element 400). Note that GUI element 400 is shown for purposes of illustration, and in other embodiments may have other suitable forms, as would be apparent to persons skilled in the relevant art(s) based on the teachings herein (e.g., a radio button, a pull down menu, etc.).

As shown in FIG. 1, network interface 106 of user device 102 may transmit a content feedback signal 120 to server 104 that indicates the feedback provided by the user to displayed content 126 and received by action interpreter 108. Content feedback signal 120 may also include identifying information for displayed content 126. As shown in FIG. 1, network interface 112 of server 104 may receive content feedback signal 120. Content selector 114 at server 104 is configured to select next content to be displayed for displayed content 126 based on the feedback received in content feedback signal 120.

For instance, if content feedback signal 120 indicates that the user did not prefer displayed content 126 (e.g., "No"), content selector 114 may select content that is not related to displayed content 126 (e.g., a different category and/or topic of content). If content feedback signal 120 indicates that the user did prefer displayed content 126, and thus desires additional similar content (e.g., "More"), content selector 114 may select content that is related to displayed content 126 (e.g., categorized in a same category, and optionally in a same topic). If content feedback signal 120 indicates that the user did prefer displayed content 126, and thus desires content that is more descriptive of displayed content 126 (e.g., "Deep"), content selector 114 may select content that is closely related to displayed content 126 (e.g., categorized in a same category, and a same topic of content under the same category).

Content selector 114 may retrieve the selected next content from content storage 116 (e.g., one or more of content 124a-124c and/or other content stored in content storage 116), and provide the selected next content to network interface 112 to transmit to user device 102. As shown in FIG. 1, network interface 112 transmits a selected next content signal 122 from server 104 that includes the next content selected by content selector 114 in response to content feedback signal 120. Network interface 106 of user device 102 may receive selected next content signal 122. The selected next content received in selected next content signal 122 may be displayed in page 118 by display screen 110 for the user to view. In an embodiment, the selected next content may be displayed in page 118 in place of displayed content 126, in a same size and position in page 118 as displayed content 126 was displayed.

In this manner, a user of user device 102 is enabled to provide content-specific feedback on content that may be displayed in a screen/page side-by-side with other content. Furthermore, the feedback is more than a mere like/dislike type of content, but also indicates further types of content that the user may desire to be displayed (e.g., different content, similar content, content that is more descriptive, etc.). Still further, the content that is selected in response to the feedback may be displayed in place of the displayed content that the feedback was provided on. Thus, a portion of a displayed page/screen may be changed based on user feedback, while the rest of the page/screen does not change.

Figure 5:
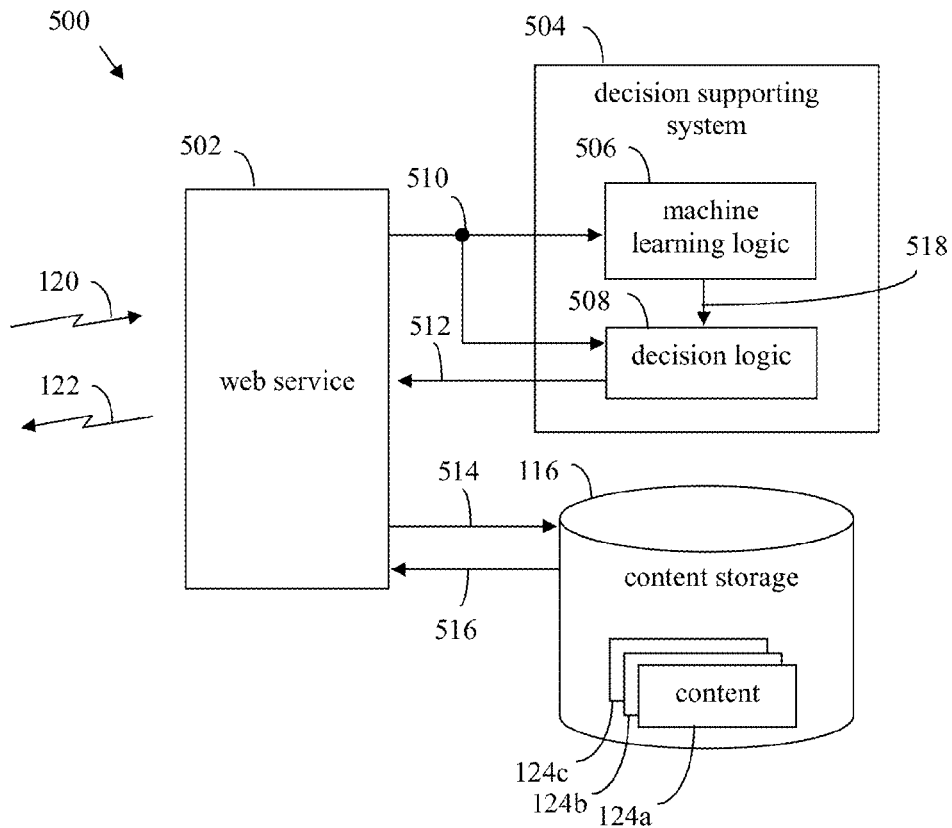
FIG. 5 shows a block diagram of a server that is configured to receive a user indicated preference regarding displayed content, and to select new content based thereon, according to an example embodiment.

In embodiments, server 104 may be configured in various ways to perform its functions. FIG. 5 shows a block diagram of a server 500 that is configured to receive a user indicated preference regarding displayed content, and to select new content based thereon, according to an example embodiment. Server 500 is an example of server 104 shown in FIG. 1. As shown in FIG. 5, server 500 includes a web service 502, a decision supporting system 504, and content storage 116. Furthermore, decision supporting system 504 includes machine learning logic 506 and decision logic 508.

Figure 6:
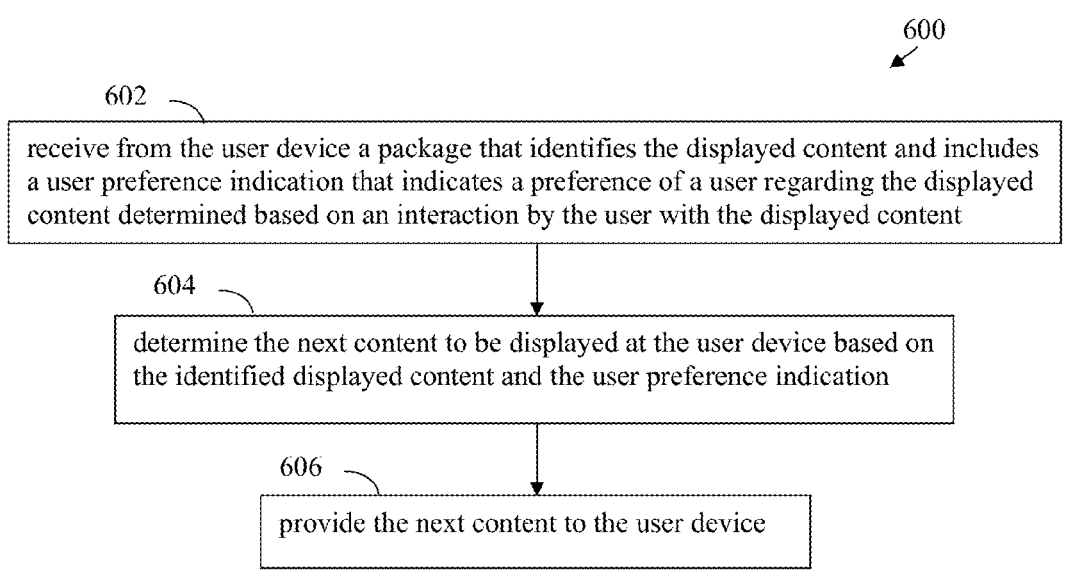
FIG. 6 shows a flowchart providing a process at a server in which new content may be selected and provided in response to an indication of a categorization of displayed content and a preference regarding the displayed content provided by a user, according to an example embodiment.

For ease of illustration, server 500 is described with reference to FIG. 6. FIG. 6 shows a flowchart 600 providing a process in which new content is selected and provided in response to a categorization of and feedback provided regarding displayed content, according to an example embodiment. In an embodiment, server 500 may operate according to flowchart 600. Flowchart 600 and server 500 are described as follows. Further structural and operational embodiments will be apparent to persons skilled in the relevant art(s) based on the following description.

Flowchart 600 begins with step 602. In step 602, a package is received from the user device that identifies the displayed content and includes a user preference indication that indicates a preference of a user regarding the displayed content determined based on an interaction by the user with the displayed content. For example, as shown in FIG. 5, web service 502 receives content feedback signal 120 from user device 102. Content feedback signal 120 may include a user data package that identifies displayed content 126, and indicates the feedback provided by the user to displayed content 126.

Displayed content 126 may be identified in the package in various ways, such as by one or more identifiers (e.g., numerical, alphanumerical, etc.) and/or other identifying information. For instance, in an embodiment, each content item may be classified in topic of a category, where multiple categories may be present, and each category includes multiple topics. Thus, each content item, such as displayed content 126, content 124a, content 124b, content 124c, etc., may be categorized by a category and topic. For example, in an embodiment, each content item may have an associated category identifier that indicates a category of the content item, may have an associated topic identifier that indicates a topic of the content item, and may have an associated content identifier that specifically (e.g., uniquely) identifies the content item itself.

Accordingly, content feedback signal 120 may include an indication of a first category identifier that indicates a category of displayed content 126, a first topic identifier that indicates a topic of displayed content 126, a first item identifier that identifies displayed content 126, and a user preference indication provided as the feedback provided by the user to displayed content 126.

Categories, topics, and content may be organized in a hierarchy in any manner, with categories at the top (broadest) and content at the bottom (most specific). Any number of different types of categories and topics may be present. Examples of categories may include news, consumer products, automobiles, technology, etc. Examples of topics under the news category may include entertainment, politics, sports, etc. Examples of topics under the consumer products category may include luxury, clothing, etc. Examples of topics under the automobiles category may include Ford, Lexus, Honda, sports cars, etc. Thus, a topic is categorized in the hierarchy as a subset of a category. Examples of content under the Ford topic may include the Focus automobile, the Fusion automobile, the Escape automobile (and/or further models of automobiles manufactured by Ford Motor Company). Thus, content is categorized in the hierarchy as an element of a topic.

Note that in other embodiments, a hierarchy may include more or fewer hierarchy levels than three as in the present example (e.g., category, topic, item). Thus, content items may be defined by more or fewer identifiers than the category identifier, topic identifier, and item identifier.

Note that the category identifier, topic identifier, and item identifier for a particular content item may be determined and assigned to the content item at any time. For instance, content 124a, content 124b, and content 124c may each have a corresponding item identifier assigned to them and associated with them in content storage 116 (e.g., by web service 502 of FIG. 5 or by other entity), prior to their being transmitted for display by a user device. Such an item identifier may be stored in metadata of the content item, or may be otherwise associated with the content item.

Furthermore, content 124a, content 124b, and content 124c may each have a corresponding category identifier and/or topic identifier assigned to them and associated with them in content storage 116 (e.g., automatically by web service 502 of FIG. 5, by a content developer, or by other entity), prior to their being transmitted for display by a user device. Alternatively, a category identifier and/or topic identifier may be assigned and associated with a content item after being transmitted to a user device, and thus may be assigned by the user device (e.g., by action interpreter 108 of FIG. 1 or by other entity).

For instance, page 118 may have an associated category identifier and topic identifier stored in code (e.g., HTML code, XML code, etc.) of page 118. For instance, the category identifier and topic identifier may be indicated as a tag, may be included in header information, or may be otherwise included in page 118. When particular content is displayed in page 118, such as displayed content 126, the particular content may have an assigned content identifier, and may take on the category and topic identifier of page 118.

In another embodiment, the particular content may be analyzed at server 104 (e.g., by web service 502) or at user device 102 (e.g., by action interpreter 108) to determine a category and topic in which the content belongs, and to thereby select the corresponding category identifier and topic identifier for the content. For instance, in one example, displayed content 126 may include text, such as one or more words, sentences, or paragraphs. The text may be parsed for one or more keywords using one or more keyword parsing techniques that will be known to persons skilled in the relevant art(s). The keywords may be applied to a first table that lists categories on one axis, and lists keywords on another axis. The category of the column (or row) that is determined by analysis of the first table to include the most keywords found in the parsed text may be selected as the category displayed content 126. Thus, the category identifier for the selected category may be associated with displayed content 126. Similarly, using a second table that lists topics on one axis, and lists keywords on another axis may be used to determine the topic, and thereby the topic identifier, for displayed content 126. In other embodiments, other types of data structures than tables may be used to determine category and topic identifiers for content, such as arrays, data maps, etc.

In another example, displayed content 126 may include one or more images (e.g., including a video, which is a stream of images). In a similar manner as described above, the image(s) can be analyzed for keywords and/or for objects (e.g., people, trees, clothing, automobiles, consumer products, luxury items, etc.), and the determined keywords and/or objects may be compared to one or more data structures to determine category and topic identifiers for displayed content 126.

Such determinations may be performed at user device 102 and/or server 104. The determined category identifier and topic identifier may be stored in metadata of the content item, or may be otherwise associated with the content item.

Referring back to FIG. 6, in step 604 of flowchart 600, the next content to be displayed at the user device is determined based on the identified displayed content and the user preference indication. Referring to FIG. 5, in an embodiment, decision logic 508 may be configured to determine next content for display at the user device based on the identified displayed content and the user preference indication.

For instance, as shown in FIG. 5, decision logic 508 receives a user data package 510 from web service 502. User data package 510 indicates the content on which feedback was provided (e.g., displayed content 126 of FIG. 1), and indicates the feedback. In an embodiment, user data package 510 may include the category identifier, the topic identifier, and the item identifier for displayed content 126 as the identifying information. Furthermore, user data package 510 may include an indication of "No", "More", or "Deep", or other suitable feedback provided by the user by interacting with displayed content 126. Decision logic 508 may determine the next content for display, which may be retrieved from content storage 116, based on the identifiers and feedback. As shown in FIG. 5, decision logic 508 generates selected content indication 512, which indicates the determined next content.

For example, if an indication of "No" is received, decision logic 508 may select new content for display that is unrelated to displayed content 126. For instance, decision logic 508 may select new content from a different category than displayed content 126. If an indication of "More" is received, decision logic 508 may select new content for display that is related to displayed content 126. Decision logic 508 may select new content from a same category of content as displayed content 126, but from a same or different topic than displayed content 126. If an indication of "Deep" is received, decision logic 508 may select new content for display that is closely related to displayed content 126. For instance, decision logic 508 may select new content from a same category of content and a same topic as displayed content 126.

Referring back to FIG. 6, in step 606, the next content is provided to the user device. For instance, as shown in the example of FIG. 5, web service 502 receives selected content indication 512 from decision logic 518. Web service 502 is configured to retrieve the next content indicated in selected content indication 512 from content storage 116. Web service 502 may issue a content retrieval request 514 that identifies the next content. Content storage 116 receives content retrieval request 514, and in response thereto, accesses the next content in storage, and provides the next content to web service 502 as selected content 516. Web service 502 may transmit selected next content signal 122 from server 500, which includes the next content selected in response to content feedback signal 120. As described above, the user device (e.g., user device 102 of FIG. 1) receives selected next content signal 122 and displays the next content contained therein to the user.

Figure 7:
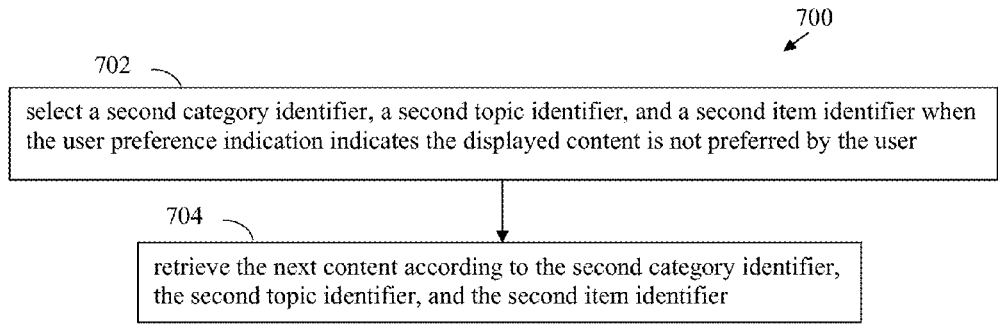
FIG. 7 shows a flowchart providing a process at a server in which new content is retrieved based on a user indicating displayed content as not preferred, according to an example embodiment.
Figure 8:
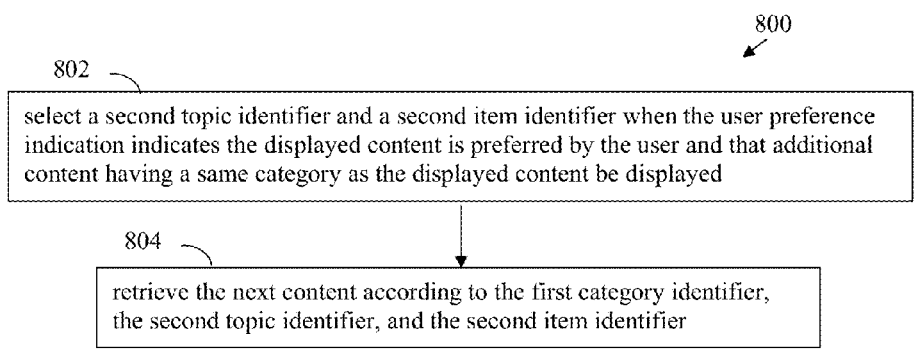
FIG. 8 shows a flowchart providing a process at a server in which new content is retrieved based on a user indication that similar content to displayed content is desired, according to an example embodiment.
Figure 9:
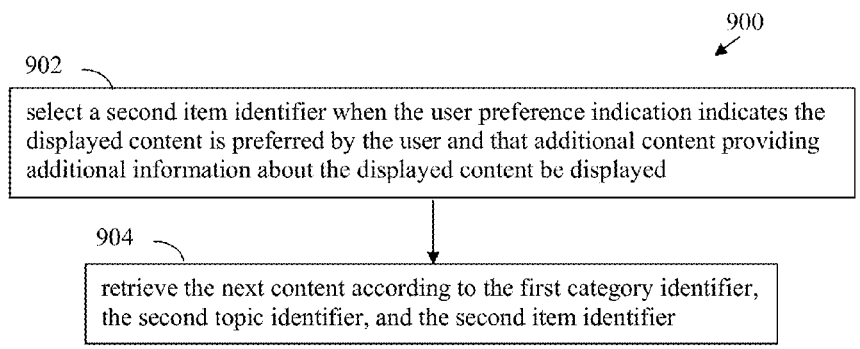
FIG. 9 shows a flowchart providing a process at a server in which new content is retrieved based on a user indication that content providing additional information for displayed content is desired, according to an example embodiment.

In embodiments, decision logic 508 may operate in various ways to perform step 604 of flowchart 600 (FIG. 6). In an example embodiment, decision logic 508 may operate according to FIGS. 7-9, which show flowcharts for selecting next content based on received content identifiers and user feedback. FIGS. 7-9 are described as follows.

For example, FIG. 7 shows a flowchart 700 providing a process at a server in which new content is retrieved based on a user indicating displayed content as not preferred, according to an embodiment. For instance, user data package 510 may include a user preference indication that indicates the user did not prefer displayed content 126 (e.g., a feedback of "No"). In such case, in step 702 of flowchart 700, a second category identifier, a second topic identifier, and a second item identifier are selected when the user preference indication indicates the displayed content is not preferred by the user. In an example, the category, topic, and item identifiers received in user data package 510 may be represented as (where "n" is an index):

$CID(n)$=Current category identifier $TID(n)$=Current topic identifier $IID(n)$=Current item identifier In the event that the user preference indication indicates that the user did not prefer displayed content 126, each identifier may be recalculated to a next value, as represented below:

$CID(n+1)$=Next($CID(n)$)

$TID(n+1)$=Next($TID(n)$)

$IID(n+1)$=Next(($IID(n)$))

where:

Next( )=a decision algorithm implemented by decision logic 508 to select next content.

In this manner, the next content may be identified by the new values for the category, topic, and item identifiers.

In step 704, the next content is retrieved according to the second category identifier, the second topic identifier, and the second item identifier. Continuing the example from step 702, in an embodiment, decision logic 508 may provide the new category, topic, and item identifiers to web service 502 in selected content indication 512, and web service 502 may retrieve the next content item identified by the new category, topic, and item identifiers from content storage 116.

FIG. 8 shows a flowchart providing a process at a server in which new content is retrieved based on a user indication that similar content to displayed content is desired, according to an example embodiment. For instance, user data package 510 may include a user preference indication that indicates the user did prefer displayed content 126 and wanted similar content (e.g., a feedback of "More"). In such case, in step 802 of flowchart 800, a second topic identifier and a second item identifier are selected when the user preference indication indicates the displayed content is preferred by the user and that additional content having a same category as the displayed content be displayed. In this example, the topic and item identifiers may be recalculated to next values, while the category identifier is not changed, as represented below:

$CID(n+1)$=$CID(n)$ $TID(n+1)$=Next($TID(n)$)

$IID(n+1)$=Next(($IID(n)$))

In this manner, the next content may be identified by the new values for the topic and item identifiers, and the same, unchanged category identifier.

In step 804, the next content is retrieved according to the first category identifier, the second topic identifier, and the second item identifier. Continuing the example from step 802, in an embodiment, decision logic 508 may provide the unchanged category identifier and the new topic and item identifiers to web service 502 in selected content indication 512, and web service 502 may retrieve the next content item identified by these identifiers from content storage 116.

FIG. 9 shows a flowchart providing a process at a server in which new content is retrieved based on a user indication that content providing additional information for displayed content is desired, according to an example embodiment. For instance, user data package 510 may include a user preference indication that indicates the user did prefer displayed content 126 and wanted content more descriptive of the displayed content (e.g., a feedback of "Deep"). In such case, in step 902 of flowchart 900, a second item identifier is selected when the user preference indication indicates the displayed content is preferred by the user and that additional content providing additional information about the displayed content be displayed. In this example, the index for the item identifier may be recalculated to a next value, while the category and topic identifiers are not changed, as represented below:

$CID(n+1)$=$CID(n)$ $TID(n+1)$=$TID(n)$ $IID(n+1)$=Next(($IID(n)$))

In this manner, the next content may be identified by the new value for the item identifier, and the same, unchanged category and topic identifiers.

In step 904, the next content is retrieved according to the first category identifier, the second topic identifier, and the second item identifier. Continuing the example from step 902, in an embodiment, decision logic 508 may provide the unchanged category and topic identifiers and the new item identifier to web service 502 in selected content indication 512, and web service 502 may retrieve the next content item identified by these identifiers from content storage 116.

Note that in an embodiment, machine learning and/or other learning techniques may be performed to improve decisions made by decision logic 508. For instance, as shown in FIG. 5, machine learning logic 506 may receive user data package 510. Machine learning logic 506 may use the contents of user data package 510 to improve a decision algorithm used by decision logic 506 to select next content. For instance, machine learning logic 506 may use machine learning to gradually adjust the decision algorithm to be more precise.

Figure 10:
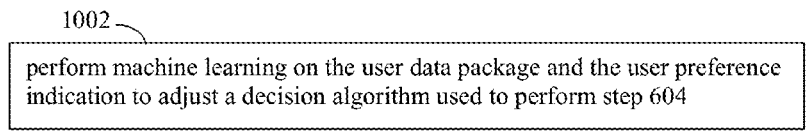
FIG. 10 shows a process for performing machine learning on user feedback provided on displayed content, according to an example embodiment.

Machine learning logic 506 may operate according to FIG. 10. FIG. 10 shows a step 1002 providing a process for performing machine learning on user feedback provided on displayed content, according to an example embodiment. In step 1002, machine learning is performed on the user data package and the user preference indication to adjust a decision algorithm used to perform step 604.

As shown in FIG. 5, machine learning logic 506 may output a modified decision algorithm 518, which is received by decision logic 508. Modified decision algorithm 518 may be used to perform future determinations of next content.

B. Example Content Feedback Interface Embodiments

As described above, users are enabled to provide feedback directly on displayed content to cause additional content to be selected and displayed. Example techniques for providing feedback on displayed content to cause additional content to be selected and displayed are described as follows. For instance, FIGS. 11-24 show examples of displayed content, of interactions by users with the displayed content to provide feedback, and of newly displayed content selected based on the feedback, according to embodiments. FIGS. 11-24 are shown for exemplary purposes, and are not intended to be limiting. Content may be displayed, and feedback may be provided thereon by users, in any suitable manner, as would be apparent to persons skilled in the relevant art(s) from the teachings herein. FIGS. 11-24 are described as follows.

Figure 11:
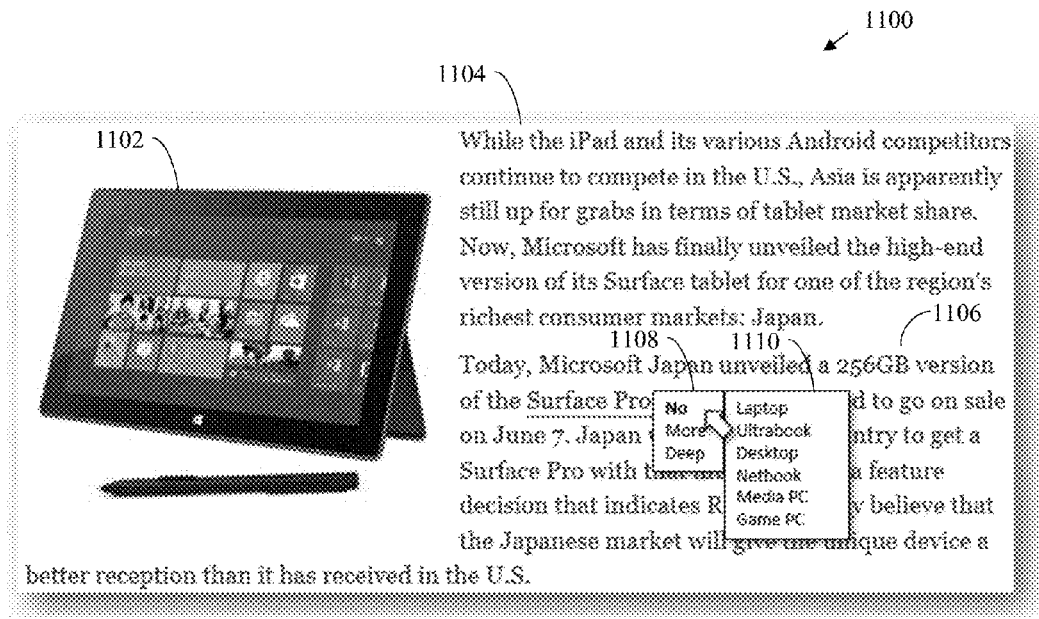
FIGS. 11-24 show examples of displayed content, of interactions by users with the displayed content to provide feedback, and of newly displayed content selected based on the feedback, according to embodiments.

In one set of examples, FIGS. 11-17 each show a page 1100 in which an image 1102 of a tablet computer is shown on a left side, and first and second paragraphs 1104 and 1106 of text are shown on a right side. In FIG. 11, a user interacts with an interface device (e.g., a touch pad, a mouse, etc.) to move a pointer over the text/keywords "Surface Pro" in second paragraph 1106 to interact with the keywords. For example, the user may perform a click using the interface device to cause a pop up menu 1108 to be presented over page 1100 with respect to the keywords. Pop up menu 1108 is similar to GUI element 400 of FIG. 4, and enables a user to indicate their feedback of one of "No", "More", or "Deep" with respect to the keywords "Surface Pro." For instance, as shown in FIG. 11, if the user selects (e.g., clicks on, hovers over, or otherwise interacts with) the option of "No" in pop up menu 1108, indicating they do not prefer the content of "Surface Pro," a second pop up menu 1110 (or other UI element) may be presented that enables the user to select alternative content to "Surface Pro" for display. In this example, "Surface Pro" may be categorized under the category of computers, and sub-category/topic of tablet computers. Thus decision logic 508 (FIG. 5) may select keywords for display that are under the category of computers, but related to other topics than tablets. In the example of FIG. 11, decision logic 508 may select keywords such as "Laptop", "Ultrabook", "Desktop", etc., for display, which may each be selected by the user to cause additional content to be displayed.

Figure 12:
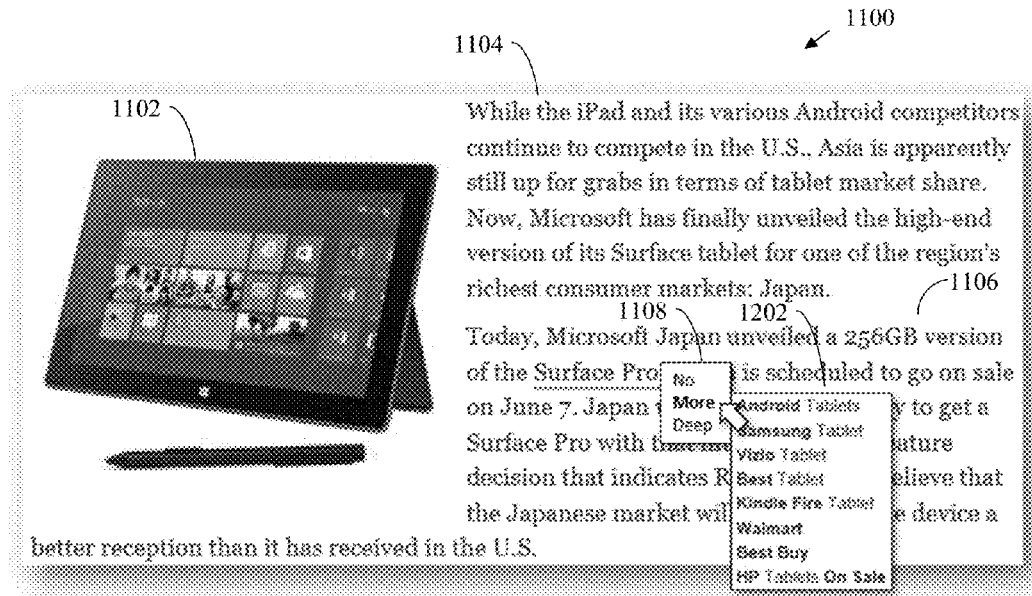

In FIG. 12, alternatively to selecting "No", the user may select the option of "More" in pop up menu 1108, indicating they do prefer the content of "Surface Pro," and want to see similar keywords. As such, a third pop up menu 1202 may be presented that enables the user to select related content to "Surface Pro" for display. In this example, decision logic 508 may select keywords for display that are under the category of computers, and included in the topic of tablet computers. For instance, decision logic 508 may select keywords such as "Android Tablets", "Samsung Tablet", etc., for display, which may each be selected by the user to cause additional content to be displayed.

Figure 13:
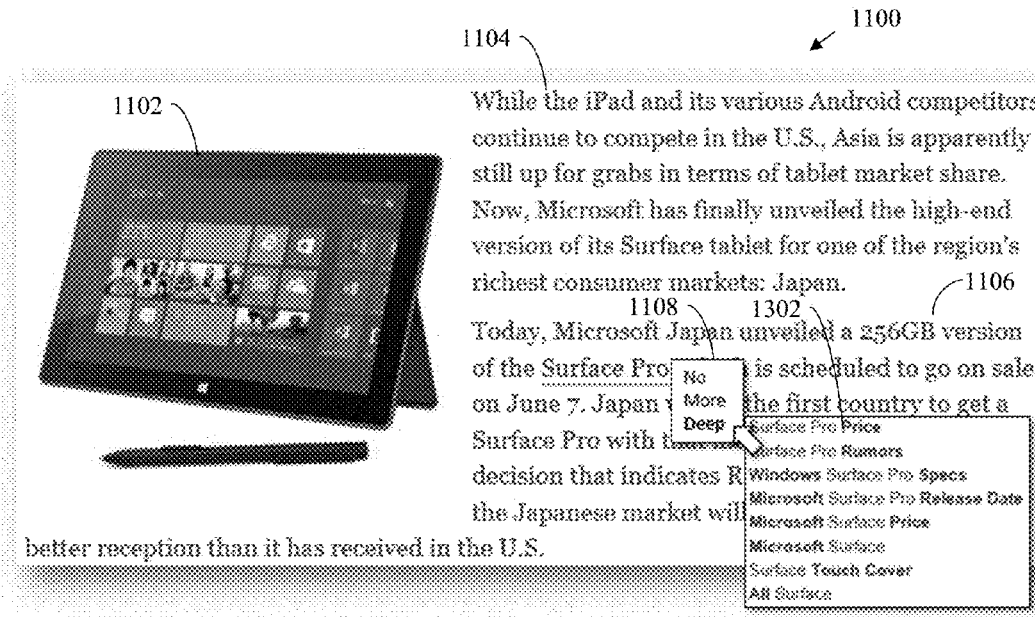

In FIG. 13, the user may instead select the option of "Deep" in pop up menu 1108, indicating they do prefer the content of "Surface Pro," and want to see more descriptive keywords regarding "Surface Pro". As such, a fourth pop up menu 1302 may be presented that enables the user to select more descriptive content to "Surface Pro" for display. In this example, decision logic 508 may select keywords for display that are under the category of computers, and topic of tablet computers, and more descriptive of "Surface Pro." For instance, decision logic 508 may select keywords such as "Surface Pro Price", "Surface Pro Rumors", etc., for display, which may each be selected by the user to cause additional content to be displayed.

Figure 14:
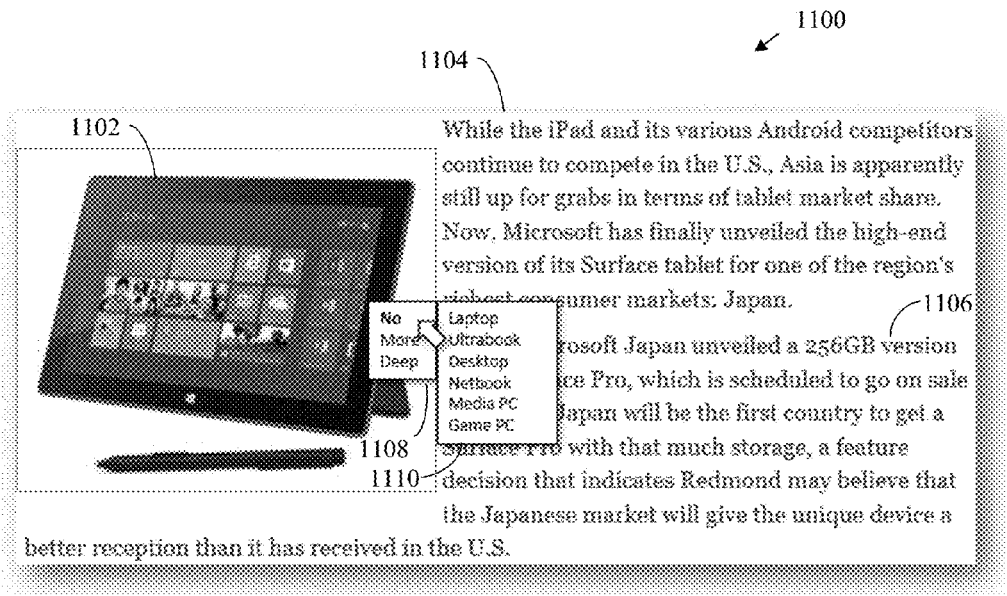
Figure 15:
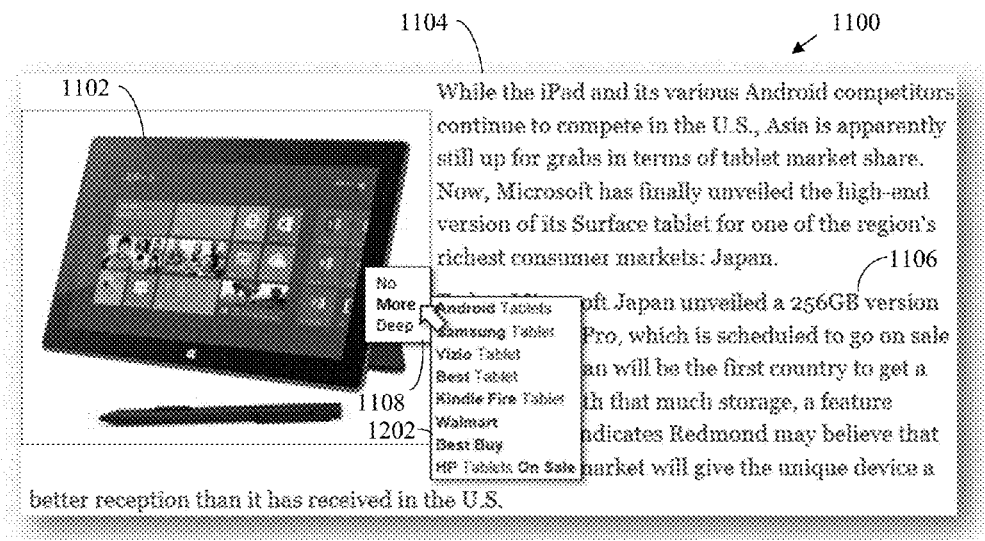
Figure 16:
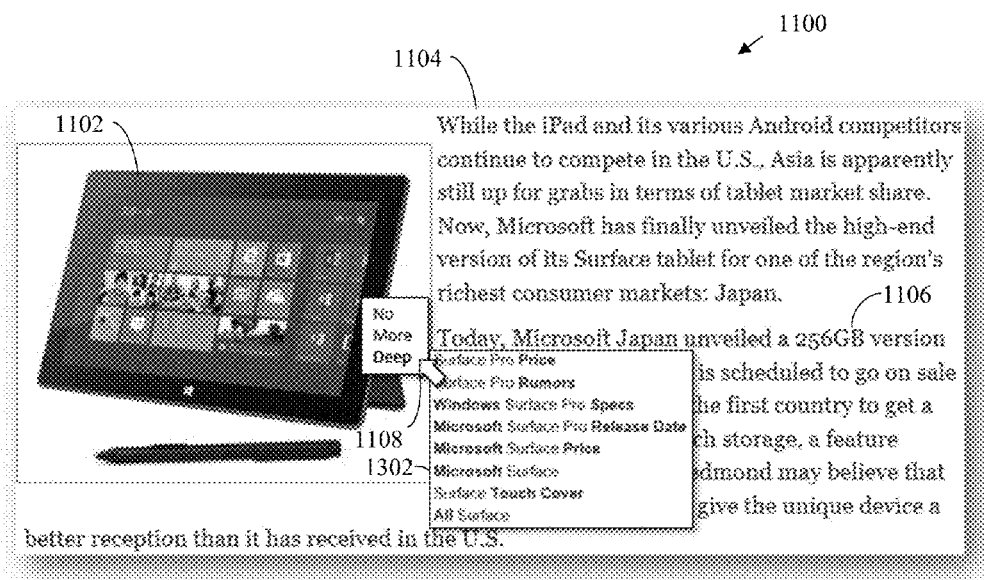

In the example of FIGS. 14-16, the user interacts with image 1102 to provide feedback by moving a pointer over image 1102. The user may perform a click using the interface device to cause pop up menu 1108 to be presented over page 1100 with respect to image 1102. In FIG. 14, the user selects the option of "No" in pop up menu 1108, indicating they do not prefer the content of image 1102. As such, second pop up menu 1110 may be presented that enables the user to select alternative content to image 1102 for display. In this example, image 1102 shows a Microsoft® Surface Pro™ computing device, and thus image 1102 may be categorized under the category of computers, and under the sub-category/topic of tablet computers. Thus decision logic 508 (FIG. 5) may select other computers for listing in pop up menu 1110 that are under the category of computers, but related to other topics than tablets. In the example of FIG. 14, decision logic 508 may select "Laptop", "Ultrabook", "Desktop", etc., for display, which may each be selected by the user to cause additional content to be displayed.

In FIG. 15, the user may instead select the option of "More" in pop up menu 1108, indicating they do prefer image 1102, and want to see similar content. As such, third pop up menu 1202 may be presented that enables the user to select related content to image 1102 for display. In this example, decision logic 508 may select images or other content for display that are under the category of computers, and included in the topic of tablet computers. For instance, decision logic 508 may list names of content such as "Android Tablets", "Samsung Tablet", etc., for display, which may each be selected by the user to cause additional content to be displayed.

In FIG. 16, the user may instead select the option of "Deep" in pop up menu 1108, indicating they do prefer image 1102 and want to see more descriptive content regarding image 110. As such, fourth pop up menu 1302 may be presented that enables the user to select content that is more descriptive of image 1102 for display. In this example, decision logic 508 may select images or other content for display that are under the category of computers, and topic of tablet computers, and more descriptive of image 1102. For instance, decision logic 508 may select content having names such as "Surface Pro Price", "Surface Pro Rumors", etc., for display, which may each be selected by the user to cause additional content to be displayed.

Figure 17:
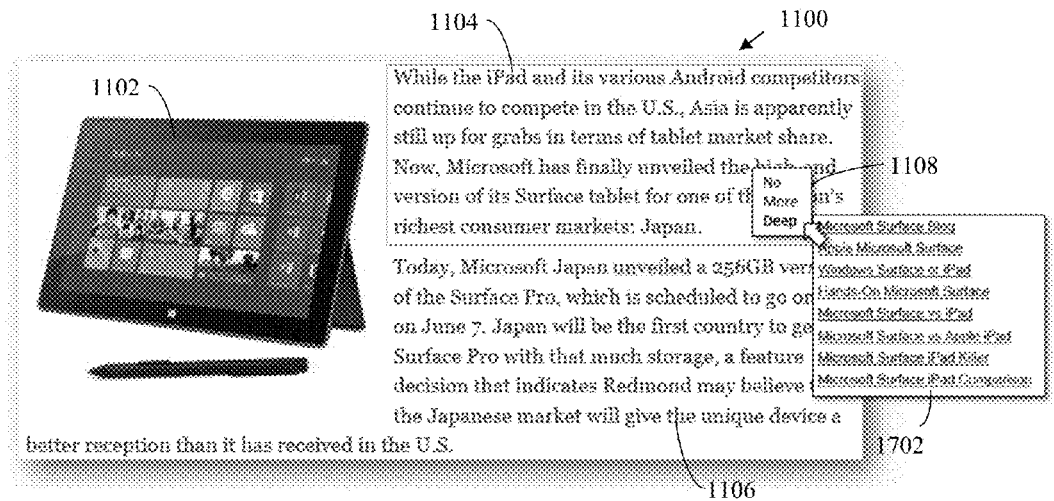

In FIG. 17, the user interacts with first paragraph 1104 to provide feedback by moving a pointer over first paragraph 1104. The user may perform a click using the interface device to cause pop up menu 1108 to be presented over page 1100 with respect to first paragraph 1104. In FIG. 14, the user selects the option of "Deep" in pop up menu 1108, indicating they do prefer first paragraph 1104 and want to see more descriptive content regarding first paragraph 1104. As such, a fifth pop up menu 1702 may be presented that enables the user to select content that is more descriptive of first paragraph 1104 for display. In this example, web service 502, decision logic 508, action interpreter 108, or other entity may analyze text of first paragraph 1104, such as by parsing the text as described above, to determine a category and topic of first paragraph 1104. For instance, computers may be determined as a category of first paragraph 1104, and Microsoft® Surface™ may be determined as the topic of first paragraph 1104. As such, decision logic 508 may select images or other content for display that are under the category of computers, and topic of Microsoft® Surface™, and are more descriptive of first paragraph 1104. For instance, decision logic 508 may select content having names such as "Microsoft Surface Blog", "Apple Microsoft Surface", etc., for display, which may each be selected by the user to cause additional content to be displayed.

In a similar manner as described above, the "No" and "More" options may be selected in pop up menu 1108 in FIG. 17 to cause additional content to be selected for display.

In another set of examples, FIGS. 18-24 each show a page 1800 in which various forms of content are present, including text and images. A first image 1802 is present in an upper left corner of page 1800 that shows a picture of a shark and includes a textual caption of "Surprise! Why you shouldn't pose for a selfie with a 'dead' shark." FIGS. 18-24 show examples of interactions with image 1802 to provide feedback, and examples of next content selected based on the feedback. FIGS. 18-22 relate to non-touch embodiments for providing feedback, FIGS. 23 and 24 relate to touch embodiments for providing feedback.

Figure 18:
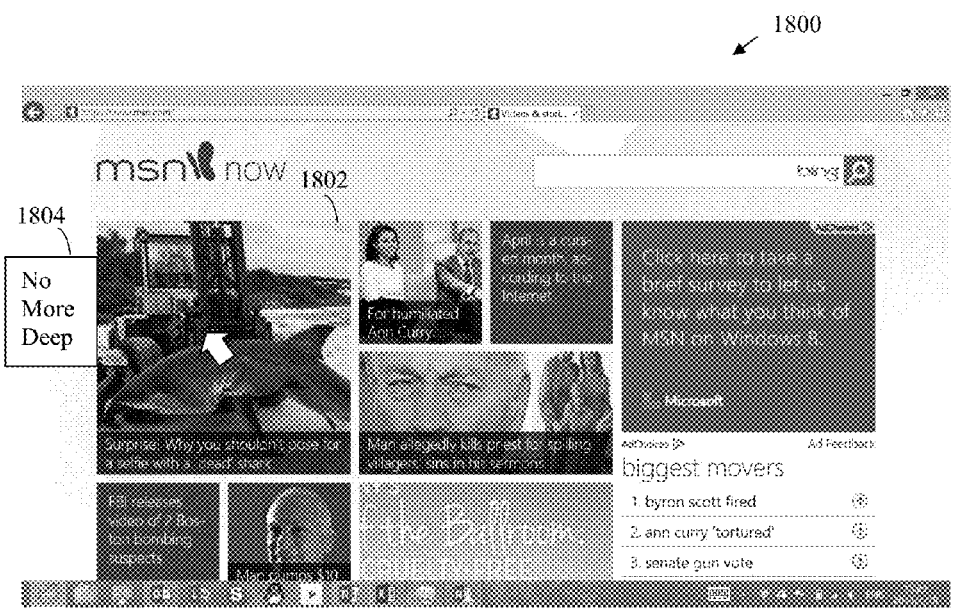
Figure 19:
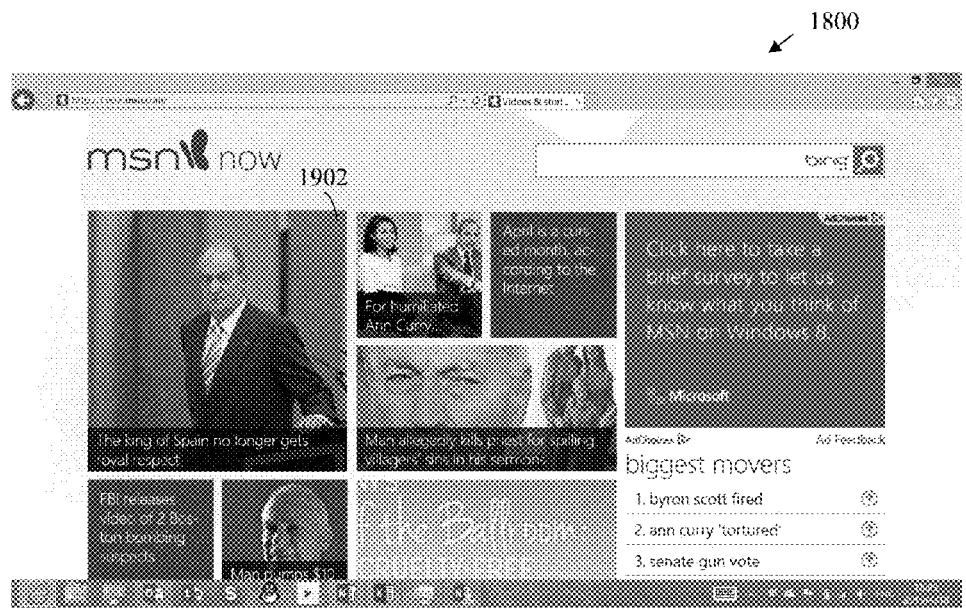

In FIG. 18, a user interacts with an interface device (e.g., a touch pad, a mouse, etc.) to move a pointer over image 1802 to provide feedback on image 1802. For example, the user may perform a click using the interface device to cause a pop up menu 1804 to be presented over page 1800 with respect to image 1802. Pop up menu 1804 is similar to GUI element 400 of FIG. 4, and enables a user to indicate their feedback of one of "No", "More", or "Deep" with respect to image 1802. For instance, as shown in FIG. 18, if the user selects the option of "No" in pop up menu 1804, indicating they do not prefer the content of "image 1802, replacement content for image 1802 may be automatically selected and displayed in place of image 1802. In this example, image 1802 may be categorized under the category of news, with a sub-category/topic of sea life. Thus decision logic 508 (FIG. 5) may select content for display that is under the category of news, but related to other topics than sea life. For instance, FIG. 19 shows page 1800 with an image 1902 displayed in place of image 1802. Image 1902 is displayed in the same position in page 1800 as was image 1802, and has a same size as image 1802. However, image 1902 is categorized under the category of news and topic of international (showing the king of Spain), and thus relates to a different topic than image 1802.

Figure 20:
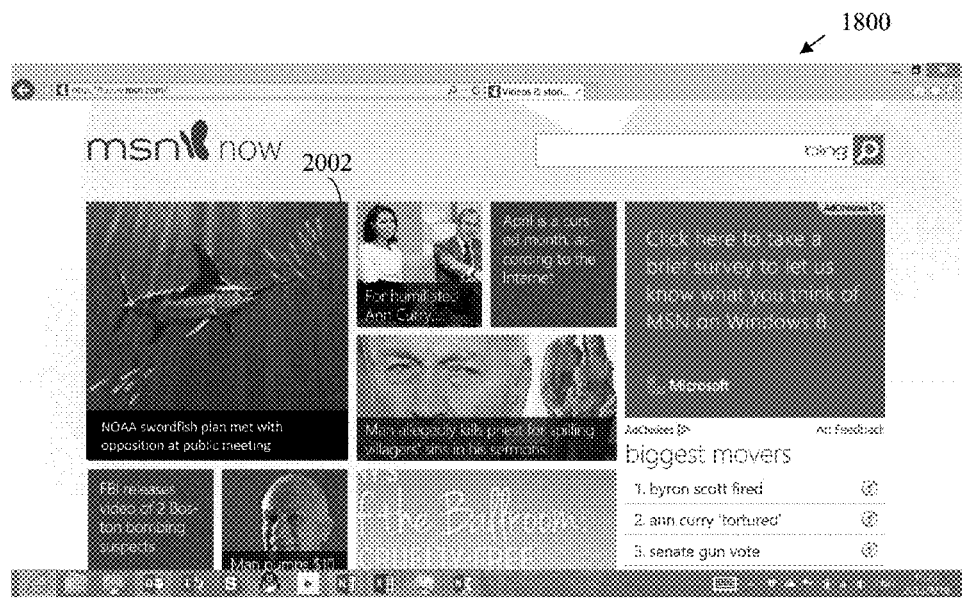

Alternatively in FIG. 18, the user may select the option of "More" in pop up menu 1802, indicating they do prefer image 1802, and want to see similar content. As such, similar content to image 1802 may be automatically selected and displayed in place of image 1802. Thus, decision logic 508 (FIG. 5) may select content for display that is categorized under the category of news and the topic of sea life. For instance, FIG. 20 shows page 2000 with an image 2002 displayed in place of image 1802. Image 2002 is displayed in the same position in page 1800 as was image 1802, and has a same size as image 1802. Image 2002 is categorized under the category of news and the topic of sea life (showing a swordfish), and thus relates to a same topic as image 1802.

Figure 21:
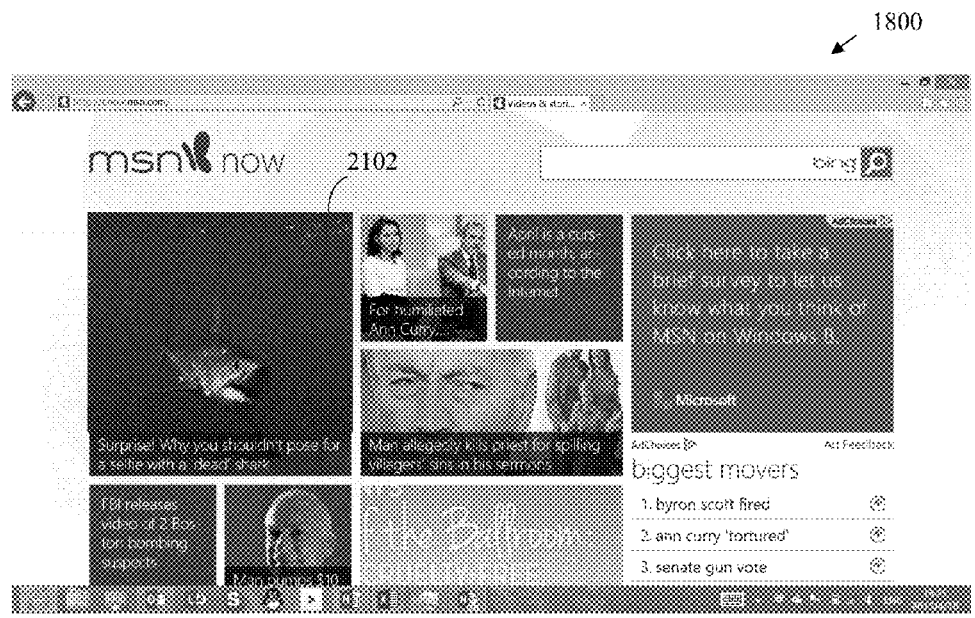
Figure 22:
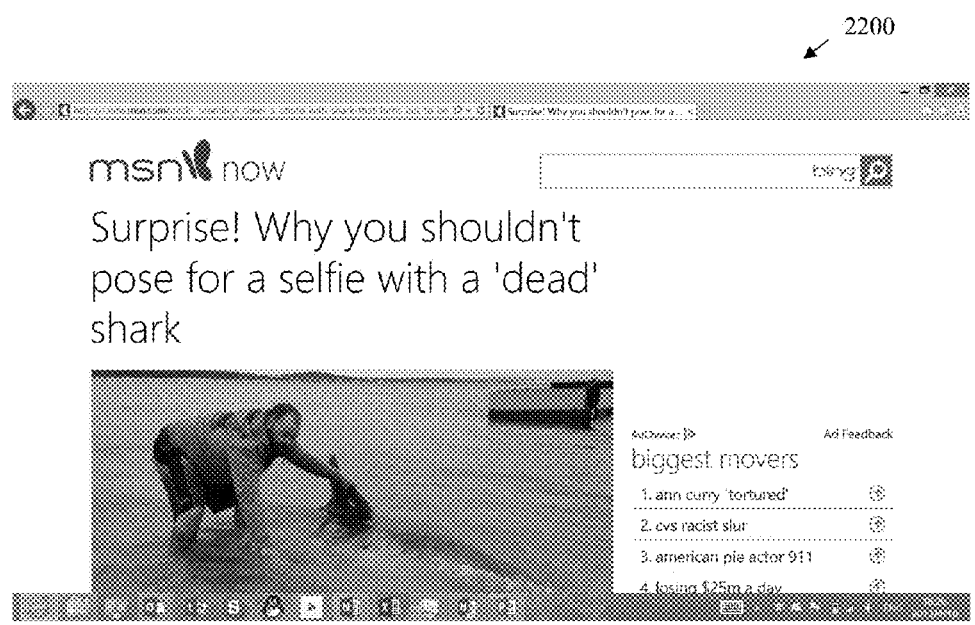

In another case, the user may select the option of "Deep" in pop up menu 1802, indicating they do prefer image 1802, and want to see more descriptive content. As such, content more descriptive of image 1802 may be automatically selected and displayed in place of image 1802. Thus, decision logic 508 (FIG. 5) may select content for display that is categorized under the category of news and the topic of sea life, and is descriptive of the content of image 1802 (e.g., sharks). For instance, FIG. 21 shows page 2100 with an image 2102 displayed in place of image 1802. Image 2102 is displayed in the same position in page 1800 as was image 1802, and has a same size as image 1802. Image 2102 is categorized under the category of news and the topic of sea life, showing a shark, and thus shows content that is descriptive of the content of image 1802.

It is noted that in an alternative embodiment, rather than displaying selected content in place of displayed content, the selected content may be displayed in another location, including a page that is different from the page of the displayed content. For instance, when the user selects the option of "Deep" in pop up menu 1802 in FIG. 18, a new page 2200 shown in FIG. 22 may be displayed that shows selected content categorized under the category of news and the topic of sea life, and that is descriptive of the content of image 1802. Page 2200 shows an image and text that relates to a person posing for a picture with a shark, and thus shows content that is descriptive of the content of image 1802.

Figure 23:
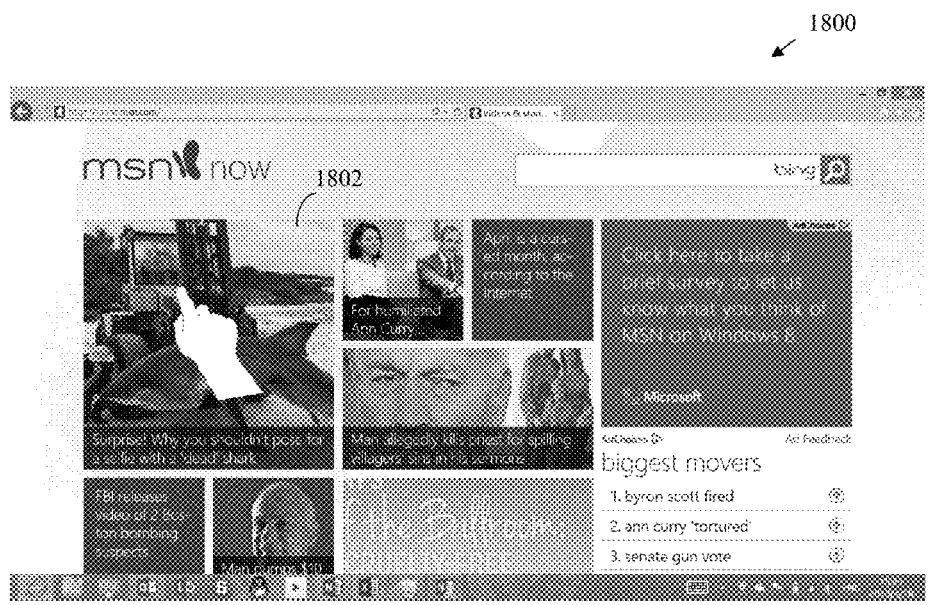

Furthermore, it is noted that the interactions with image 1802 with or without pop up menu 1804 may be performed using touch, motion sensing, speech recognition, or other feedback interface techniques. For instance, FIG. 23 shows a user that touches a display screen at a location of image 1802 in page 1800 to provide feedback on image 1802, as represented by a transparent hand in FIG. 23. The user may touch the screen in any manner, according to any pattern, to convey a selection of "No," "More," or "Deep" with respect to image 1802. For instance, the user may touch an upper portion of image 1802 in page 1800 to indicate "No," may touch a left side portion of image 1802 in page 1800 to indicate "More," or may touch a central portion of image 1802 in page 1800 to indicate "Deep." In touch embodiments, any combination of touching, including finger touches/taps, dragging/swiping of fingers, double tapping or additional taps, etc., may be used to indicate selections by the user.

Figure 24:
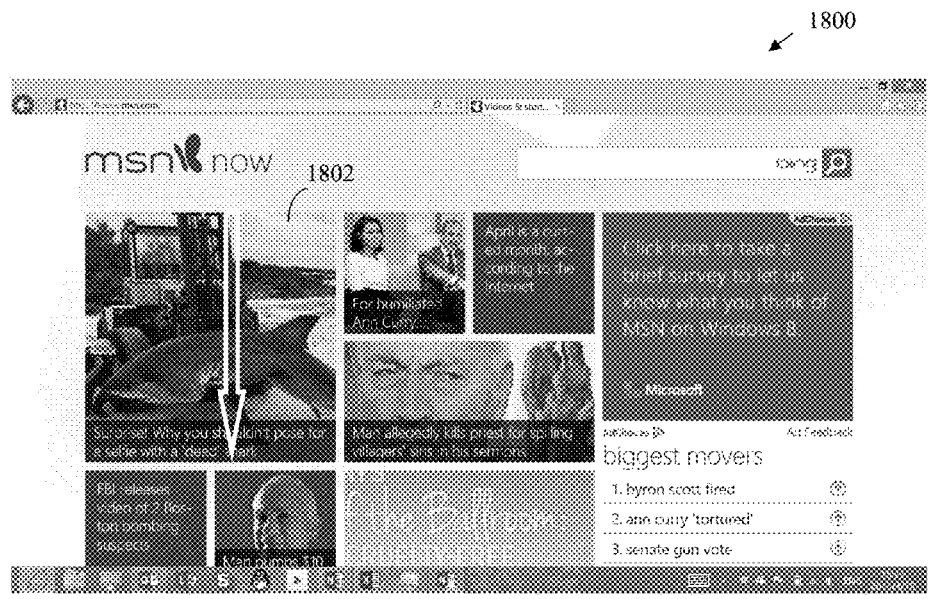

For instance, FIG. 24 shows an example of a finger being dragged downward on page 1800 over content 1802 to indicate "No". Similarly, a rightward drag of a finger over content 1802 may indicate "More", and a tap on content 1802 may indicate "Deep."

Thus, user feedback on content may be provided in various ways, and using any combinations of feedback techniques, including combinations of touch, non-touch, motion sensing of gestures, voice, etc.

In a non-touch example, "No" and "More" may be represented by displaying clickable buttons when a pointer is hovered over content, and "Deep" may be represented by a mouse click on the content.

In a touch example, "No" may be represented by a swipe up/down, "More" may be represented by a swipe left/right, and "Deep" may be represented by tapping on the content.

In motion example (e.g., using a Microsoft® Kinect™ device), "No" may be represented by waving your hand(s) up/down, "More" may be represented by waving your hand(s) left/right, and "Deep" may be represented by holding your hand(s) in a fist.

In a gesture example (e.g., using a Microsoft® Kinect™ device), "No" may be represented by a user shaking their head, "More" may be represented by the user nodding their head, and "Deep" may be represented by the user smiling.

In a voice example, "No" may be represented by a user saying "No," "More" may be represented by the user saying "More," and "Deep" may be represented by the user saying "Deep."

In a combination interaction example, "No" may be represented by a user shaking their head (gesture), "More" may be represented by the user saying "More" (voice), and "Deep" may be represented by the user tapping on the displayed content (touch).

Note that these examples are provided for purposes of illustration, and are not intended to be limiting. It will be apparent to persons skilled in the relevant art(s) based on the teachings herein that any way of providing feedback, and combinations thereof, may be used.

C. Example Embodiments for an Extensible User Interface for Providing Feedback

As described above, user device 102 may enable users to interact with content to provide feedback in various ways.

For instance, users may be able to provide feedback in a non-touch manner, by touch, by motion, by gesture, by voice, etc. In an embodiment, user device 102 may be configured to be extensible such that different techniques for providing feedback on content may be added or removed from user device 102. The different techniques for providing feedback may be used separately or together. As such, a user of user device 102 may select a most comfortable way for the user to interact with user device 102. An indication of the feedback provided by the user may be transmitted to a content provider to have new content transmitted to user device 102 for display.

Figure 25:
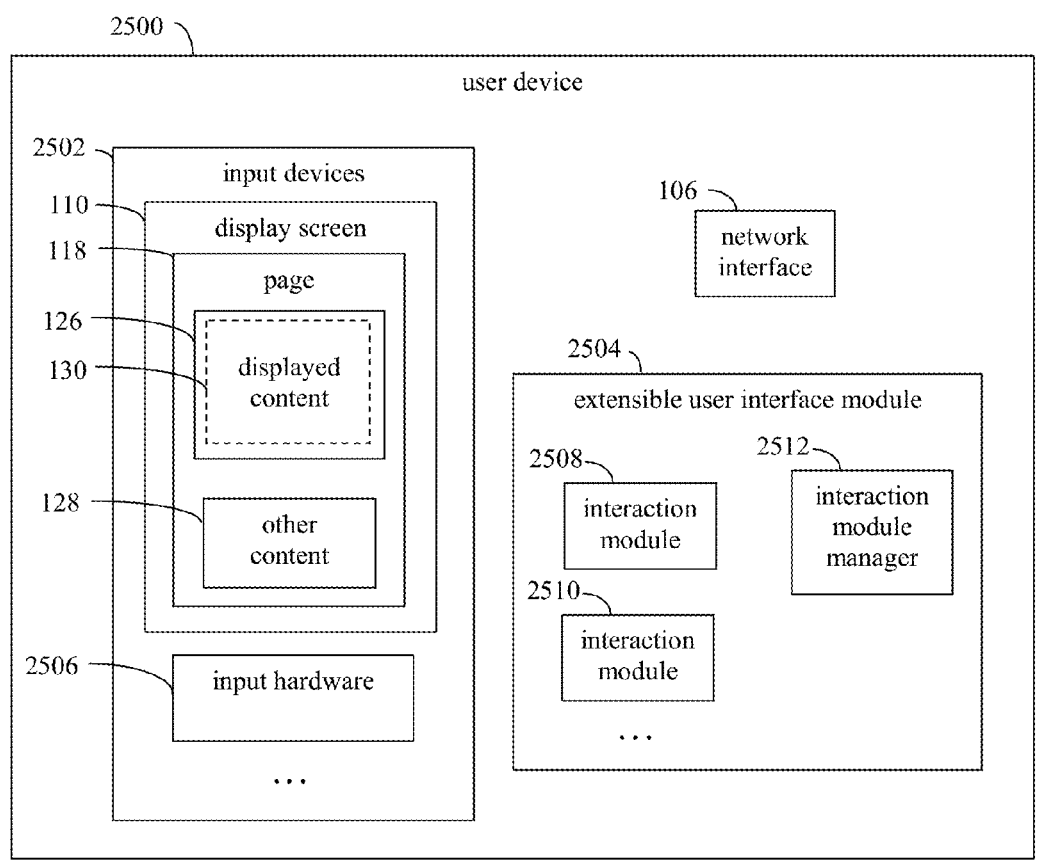
FIG. 25 shows a block diagram of an exemplary user device configured to be extensible to enable various ways of interaction with content to provide feedback, according to embodiments.

User device 102 may be configured in various ways to be extensible. For instance, FIG. 25 shows a block diagram of a user device 2500 that is extensible to enable multiple ways of interacting with content to provide feedback, according to embodiments. User device 2500 is an example of user device 102 shown in FIG. 1. As shown in FIG. 25, user device 2500 includes network interface 106, one or more input devices 2502, and an extensible user interface (UI) module 2504. Input device(s) 2502 includes display screen 110, input hardware 2506, and optionally further instances of input hardware. Extensible UI module 2504 is an example of action interpreter 108 of FIG. 1. As shown in FIG. 25, extensible UI module 2504 includes a first interaction module (IM) 2508, a second IM 2510, optionally one or more further IMs, and an IM manager 2512. User device 2500 is described as follows.

Similarly to the description provided above with respect to user device 102 (FIG. 1), a user of user device 2500 may interact with a user interface of user device 2500 to browse content and cause content to be displayed by display screen 110. For instance, content may be displayed by display screen 110 contained in page 118, such as a web page rendered by a web browser, or content may be displayed in other form by another application. As shown in FIG. 25, display screen 110 may display displayed content 126 and other content 128.

The user may interact with one or more input interfaces included in input devices 2052 to provide feedback. For instance, the user may interact with display screen 110 in a touch or non-touch manner, may provide motion and/or gestures, may provide voice, and/or may interact with user device 2500 in another manner, depending on the hardware that is present in user device 2500. Display screen 110 is one example of hardware that may be present, which may be interacted with by a user in a touch manner. Input hardware 2506 is another example of hardware that is present, and one or more further instances of input hardware may be present. Examples of such input hardware include a mouse pointer used to interact with a graphical user interface (GUI) displayed by display screen 110, a keyboard, a motion sensor, a gesture sensor, a microphone for voice input, etc.

Extensible UI module 2504 is configured to provide an interface between one or more forms of input hardware and a server (e.g., server 104 of FIG. 1) to translate the user interactions to feedback that may be processed by the server. For example, IM modules 2508 and 2510 may each be configured as plug-in modules that may be included in extensible UI module 2504 to enable a user to provide feedback through a corresponding input device of input devices 2502. For instance, if it is desired for a user to be enabled to provide feedback on displayed content using touch, interaction module 2508 may be plugged into extensible UI module 2504 to enable touch feedback to be interfaced between display screen 110 and a content provider. In another example, if it is desired for a user to be enabled to provide feedback on displayed content by voice, interaction module 2510 may be plugged into extensible UI module 2504 to enable voice feedback to be interfaced between a microphone of input devices 2502 and a content provider. Interaction modules 2508 may convert the feedback received from the hardware of input devices 2502 to a common format, and may provide the converted feedback to IM manager 2512. IM manager 2512 may generate a message to be transmitted to a server (e.g., server 104 of FIG. 1) by network interface 106 (e.g., as content feedback signal 120 of FIG. 1). In response, a content provider may provide next content for display by user device 2500 in display screen 110. The next content may optionally be displayed in place of displayed content 126 in page 118.

Figure 26:
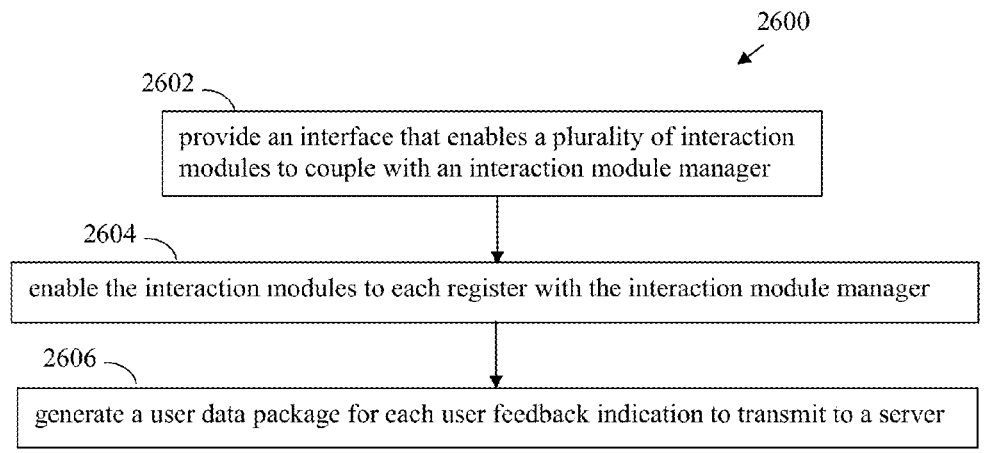
FIG. 26 shows a flowchart providing a process at a user device for providing an extensible interface for receiving feedback on displayed content, according to an example embodiment.
Figure 27:
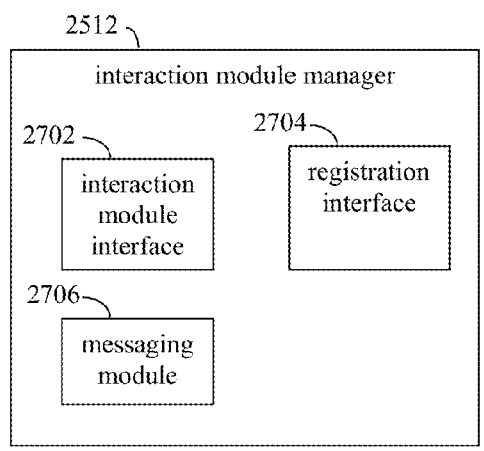
FIG. 27 shows a block diagram of an interaction module manager that provides an extensible interface for receiving feedback on displayed content, according to an example embodiment.

IM manager 2512 may be configured in various ways to perform its functions, and may perform its functions in various ways. For instance, FIG. 26 shows a flowchart 2600 providing a process at a user device for providing an extensible interface for receiving feedback on displayed content, according to an example embodiment. In an embodiment, flowchart 2600 may be performed by IM manager 2512 of FIG. 25. For purposes of illustration, flowchart 2600 is described with respect to FIG. 27. FIG. 27 shows a block diagram of IM manager 2512, according to an example embodiment. As shown in FIG. 27, IM manager 2512 includes an IM interface 2702, a registration interface 2704, and a messaging module 2706. Flowchart 2700 and IM manager 2512 are described as follows. Note that not all steps of flowchart 2700 need to be performed in all embodiments, and the steps of flowchart 2700 may be performed in alternative orders than shown in FIG. 26. Further structural and operational embodiments will be apparent to persons skilled in the relevant art(s) based on the following description.

Flowchart 2600 begins with step 2602. In step 2602, an interface is provided that enables a plurality of interaction modules to couple with an interaction module manager. For example, in an embodiment, IM interface 2702 may be provided as an interface for interaction modules to couple to (i.e., "plug-in" to) IM manager 2512. IM interface 2702 may be configured to couple with any number of one or more interaction modules, including interaction module 2508 and interaction module 2510 of FIG. 25, and any number of additional interaction modules. Each interaction module is configured to enable feedback to be provided by a corresponding input device/hardware. Accordingly, IM interface 2702 enables extensible UI module 2504 of FIG. 25 to be extensible to any number of content interaction/feedback mechanisms.

A particular interaction module may be interfaced with IM interface 2702 in various ways, in embodiments. For instance, in one example, a user interface may be displayed by user device 2500 of FIG. 25 (e.g., by display screen 110) that a user may interact with to select a particular interaction module (e.g., from an attached storage device, from over a network, etc.) for installation, including being plugged into IM manager 2512 through IM interface 2702. In another embodiment, when a particular input device/hardware is coupled to user device 2500 (e.g., adding a microphone, installing motion sensing functionality, etc.), the corresponding interaction module may be automatically installed, and thereby plugged into extensible UI module 2504 through IM interface 2702, without a user having to specifically configure installation of the interaction module. In other embodiments, interaction modules may be coupled to IM interface in other ways. In an embodiment, extensible UI module 2504 may include a download module that enables an interaction module to be downloaded over a communication link or network and installed on user device 2500 to enable an additional content interaction technique.

Referring back to FIG. 26, in step 2604, each interaction module is enabled to register with the interaction module manager. In an embodiment, registration interface 2704 of FIG. 27 may be configured to enable interaction modules to register with IM manager 2704. For instance, an identifier for the particular interaction module may be recorded by registration module 2704 in a data structure (stored in storage) along with an indication of the one or more input devices that the particular interaction module interfaces with to receive feedback. The IM identifier and input device(s) may be stored together in the data structure (e.g., a file, a database, an array, etc.) as key and value pairs, or in any other manner, as would be apparent to persons skilled in the relevant arts(s) from the teachings herein.

Furthermore, optionally, each coupled interaction module may be requested periodically to provide a health status of the corresponding input devices/hardware. For example, registration module 2704 may provide a hardware health status request to an interaction module, such as interaction module 2508 shown in FIG. 25. Such a request may be provided at any time, such as whenever IM manager 2512 is initialized, according to a regular schedule, and/or at any other time or frequency. All interaction modules, including interaction module 2508, may implement a common health check interface implemented by IM manager 2512, and thus may communicate with registration module 2508 in a common format regarding health status checking. In response to the request, interaction module 2508 may determine a health of its associated input hardware, such as display screen 110 or input hardware 2506. For instance, interaction module 2508 may transmit a health request signal to its associated input hardware, may monitor output signals of its associated input hardware for proper function, and/or may determine a health of its associated input hardware in another manner. Based on the determination of the health of its associated input hardware (e.g., receiving a health indication signal from the input hardware, matching monitored output signals against proper health indicators, etc.), interaction module 2508 may provide a health status indication to registration module 2704 for the input hardware.

As a result, for all coupled interaction modules that provide a healthy health status for their input hardware (e.g., indicating the input hardware is operational), registration module 2704 may enable those interaction modules to accept user interaction with, and user feedback from, the healthy input hardware. Otherwise, all coupled interaction modules that provide an unhealthy health status for their input hardware (e.g., the input hardware is not operational, or not operating within desired tolerances), registration module 2704 may disable those interaction modules from accepting user interaction and feedback from the unhealthy input hardware.

Referring back to FIG. 26, in step 2606, a user data package is generated for each user feedback indication to transmit to a server. In an embodiment, messaging module 2706 (FIG. 27) may be configured to generate a user data package for each user feedback indication received from an interaction module. For instance, messaging module 2706 may generate the user data package included in content feedback signal 120 (FIG. 1). As described further above, the user data package may identify displayed content 126 and indicate the feedback provided by the user to displayed content 126. In embodiments, messaging module 2706 may be configured to generate user data packages for all interaction modules that are coupled to IM manager 2512 via IM interface 2702 when they provided feedback on content. In this manner, messaging module 2706 may be present and capable of generating user data packages for any number of interaction modules that are "plugged in".

Figure 28:
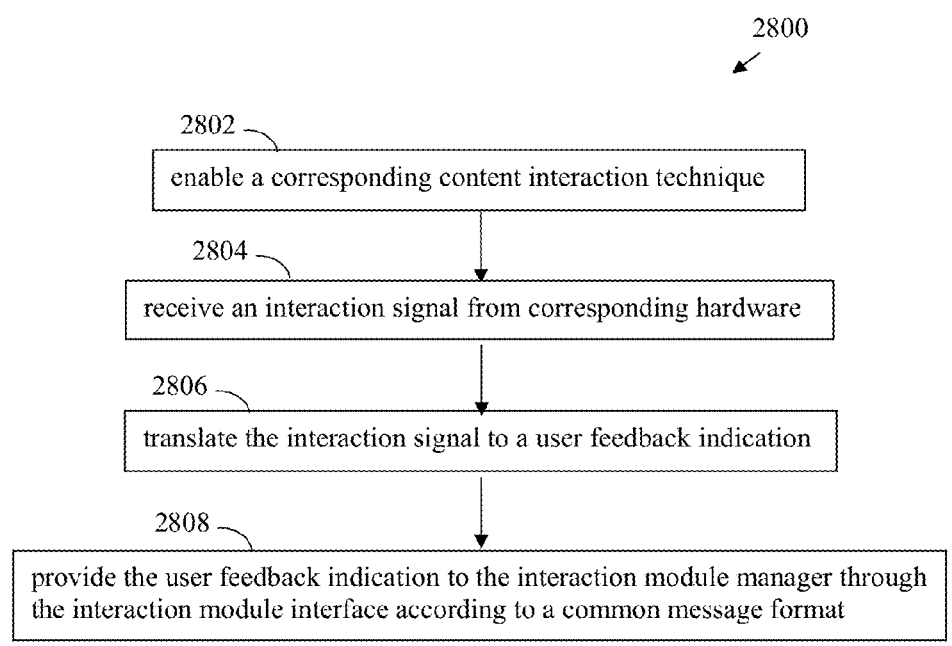
FIG. 28 shows a flowchart providing a process in an interaction module for receiving feedback on displayed content, according to an example embodiment.

Accordingly, by coupling with IM manager 2512, interaction modules may provide an interface between input devices and content providers for providing user feedback on displayed content. Such interaction modules may operate in various ways. For instance, FIG. 28 shows a flowchart 2800 providing a process in an interaction module for receiving feedback on displayed content, according to an example embodiment. In embodiments, interaction modules 2508 and 2510 of FIG. 25, as well as any further interaction modules that are present, may each operate according to flowchart 2800. Flowchart 2800 is described as follows.

Flowchart 2800 begins with step 2802. In step 2802, a corresponding content interaction technique is enabled. For instance, interaction modules 2508 and 2510 of FIG. 25, as well as any further interaction modules that are present, may each enable a corresponding interaction technique by being configured to communicate with input hardware that enables user interactions according to the particular interaction technique.

In step 2804, an interaction signal is received from corresponding hardware. In embodiments, interaction modules 2508 and 2510 of FIG. 25, as well as any further interaction modules that are present, may each be configured to receive signals indicative of interactions with their corresponding input hardware. For instance, referring to interaction module 2508 for illustrative purposes, interaction module 2508 may be a touch interaction module that communicates with display screen 110. Interaction module 2508 may receive an interaction signal from display screen 110 that indicates a touch pattern applied to display screen 110.

In step 2806, the interaction signal is translated to a user feedback indication. In embodiments, interaction modules 2508 and 2510 of FIG. 25, as well as any further interaction modules that are present, may each be configured to translate the signals received from their respective input hardware into user feedback indications. For instance, continuing the current example, interaction module 2508 may translate the received interaction signal from display screen 110 indicating a touch pattern to one of the user feedback indications of No," "More," or "Deep."

In step 2808, the user feedback indication is provided to the interaction module manager through the interaction module interface according to a common message format. In embodiments, interaction modules 2508 and 2510 of FIG. 25, as well as any further interaction modules that are present, may each be configured to transmit a translation of a received interaction signal to IM manager 2512. The interaction modules may all be configured to provide their translated user feedback indications to IM interface 2702 (FIG. 27) of IM manager 2512 in a common format across the interaction modules, which enables the interaction modules to be more easily plugged in. For instance, continuing the current example, interaction module 2508 may provide the user feedback indications of No," "More," or "Deep" to IM manager 2512 in a common format of predetermined data values or codes (e.g., "0"="No", "1"="More", "2"="Deep") or in another common format recognized by IM manager 2512. In response, IM manager 2512 may transmit the user feedback indications to a server (e.g., via messaging module 2706 of FIG. 27) so that a content provider may provide next content for display.

Accordingly, embodiments provide an extensible interface for users to interact with displayed content to provide feedback. A user can express his/her preference by one or a combination of actions with available input hardware devices. One or more corresponding interaction modules receive the interaction signals from the input hardware devices, and translate the signals to user preference information. Any number of types of interaction modules may be present, including non-touchable, touchable, gesture sensing, motion sensing, voice, etc. Interaction modules may be added (plugged-in) or removed (decoupled or unplugged) to enable or disable the usage of corresponding input hardware devices. An IM manager may be present to collect the user preference data received by the interaction modules, and to send messages to the server side to query for content to be displayed next. The server returns the next content, and the new content is displayed on the display screen of the user device.

Figure 29:
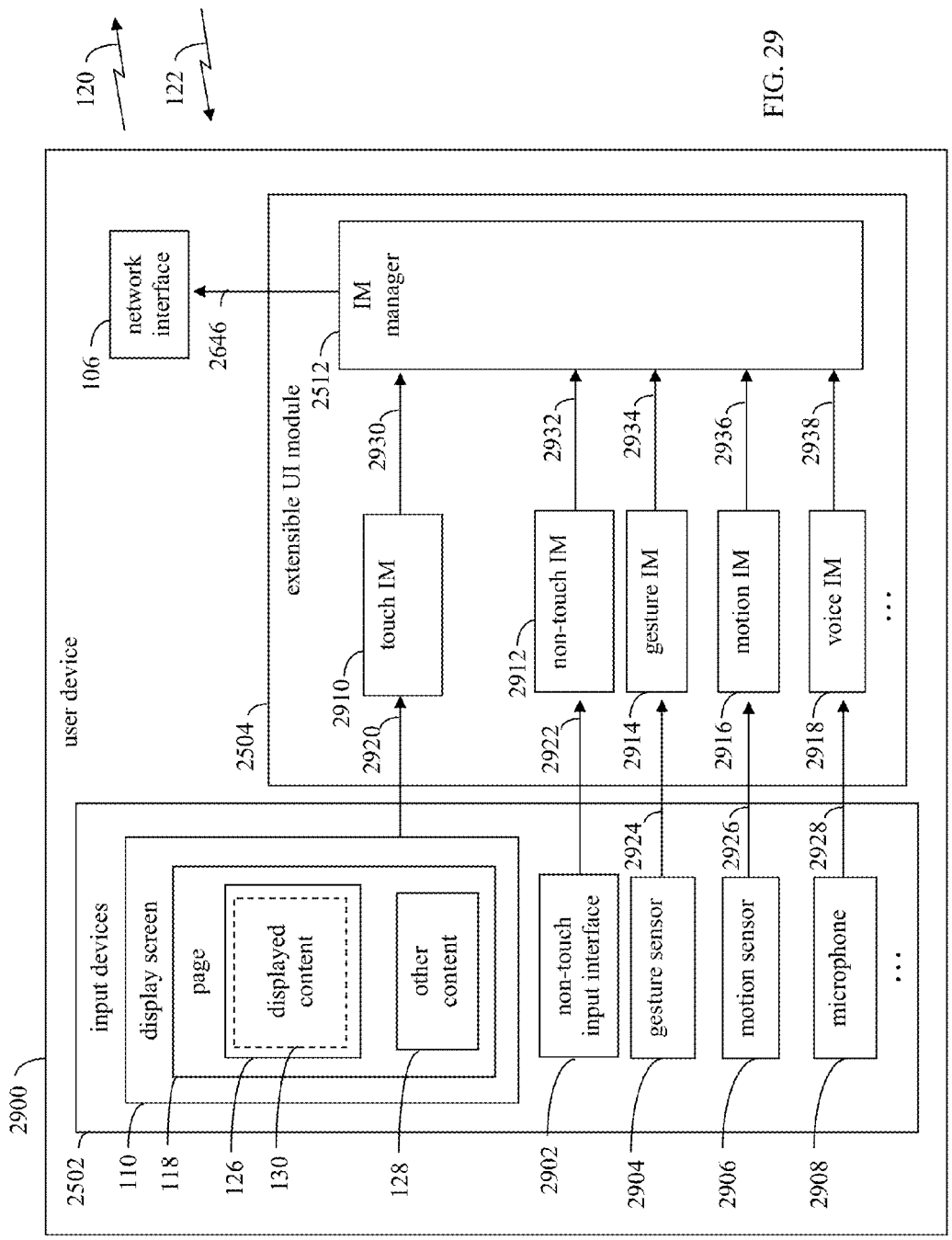
FIG. 29 shows a block diagram of a user device that is extensible to enable multiple ways of interaction with content to provide feedback, according to an example embodiment.

FIG. 29 shows a block diagram of a user device 2900 configured to enable multiple ways of interaction with content to provide feedback, according to an example embodiment. FIG. 29 is provided as an example of user device 2500 of FIG. 25, and is not intended to be limiting. In embodiments, user devices may include any number and combination of input devices and interface modules for providing feedback on content. As shown in FIG. 29, user device 2900 includes network interface 106, input devices 2502, and extensible user interface (UI) module 2504. Input devices 2502 includes display screen 110, a non-touch input interface 2902, a gesture sensor 2904, a motion sensor 2906, and a microphone 2908. Extensible UI module 2504 includes a touch IM 2910, a non-touch IM 2912, a gesture IM 2914, a motion IM 2916, a voice IM 2918, and IM manager 2512. User device 2900 is described as follows.

Similarly to the description provided above with respect to user device 2500 (FIG. 25), a user of user device 2900 may interact with a user interface of user device 2900 to browse content, and cause content to be displayed by display screen 110. For instance, content may be displayed by display screen 110 contained in page 118, such as a web page rendered by a web browser, or content may be displayed in other form by another application. As shown in FIG. 29, display screen 110 may display displayed content 126 and other content 128.

Figure 30:
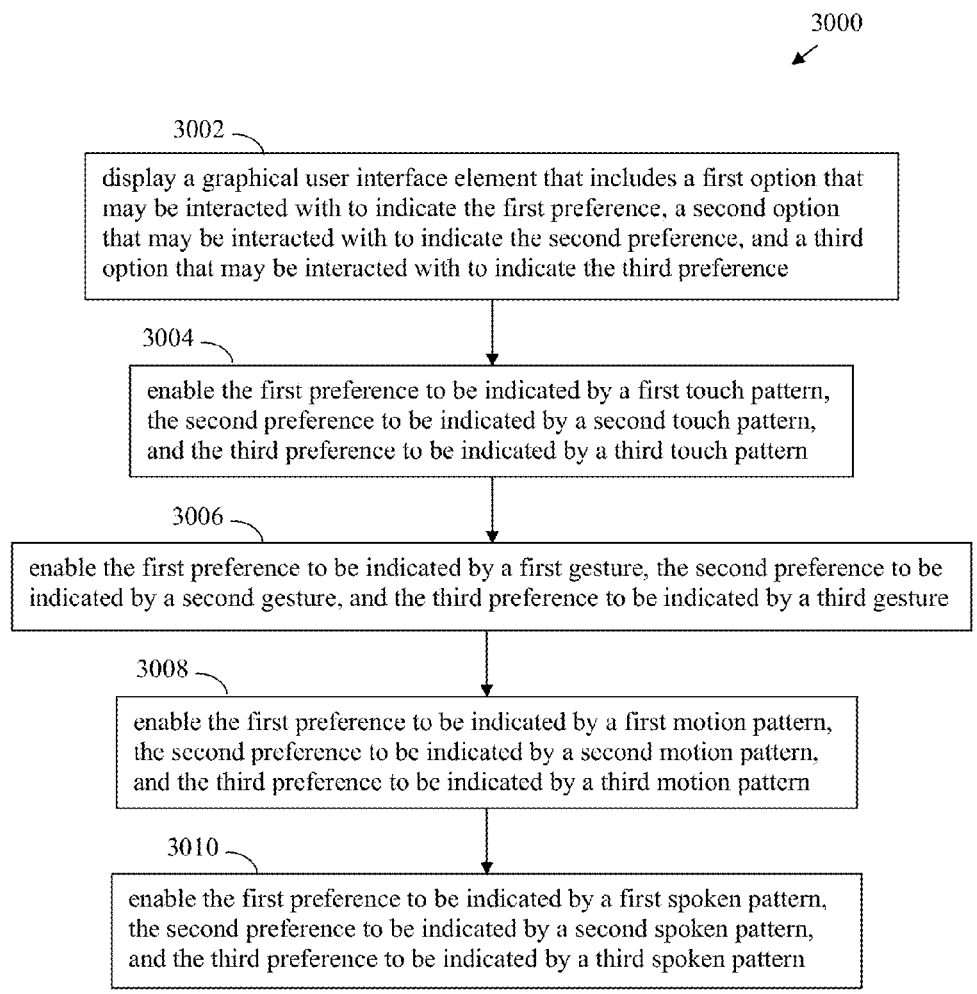
FIG. 30 shows a flowchart providing various example mechanisms for enabling feedback to be provided on displayed content, according to an example embodiment.

To provide feedback on content, the user may interact with one or more of display screen 110, non-touch input interface 2902, gesture sensor 2904, motion sensor 2906, and microphone 2908. For purposes of illustration, the input devices of FIG. 29 are described with respect to FIG. 30. FIG. 30 shows a flowchart 3000 providing processes for enabling feedback on displayed content, according to an example embodiment. Note that not all steps of flowchart 3000 need to be performed in all embodiments, and the steps of flowchart 300 that are performed depend on the input devices and interaction modules that are present and plugged in. Further structural and operational embodiments will be apparent to persons skilled in the relevant art(s) based on the following description.

Flowchart 3000 begins with step 3002. In step 3002, a graphical user interface element is displayed that includes a first option that may be interacted with to indicate the first preference, a second option that may be interacted with to indicate the second preference, and a third option that may be interacted with to indicate the third preference. In an embodiment, display screen 110 may display feedback interface 130 in the form of a graphical user interface, such as GUI element 400 of FIG. 4, that a user may interact with to provide feedback as described above. For instance, in an embodiment, non-touch input interface 2902 may be present to enable the user to select an option to provide feedback on displayed content. For instance, non-touch input interface 2902 may include a mouse pointer, a stick, or other non-touch-screen mechanism for selecting an option displayed by the GUI (e.g., by moving a pointer and making a "click," etc.), including options such as "No," "More," or "Deep".

As shown in FIG. 29, non-touch input interface 2902 generates a non-touch interaction signal 2922 that includes the provided feedback in the form of the interactions with non-touch input interface 2902 (e.g., a pointer movement pattern, mouse clicks, etc.). Non-touch IM 2912 may be optionally plugged into IM manager 2512 to interface non-touch input interface 2902 with IM manager 2512. According to flowchart 2800 (FIG. 28), non-touch IM 2912 receives and translates non-touch interaction signal 2922 into a user feedback indication (e.g., "No," "More," or "Deep") in a common message format. For example, non-touch IM 2912 may include a driver for non-touch input interface 2902 (e.g., a mouse pointer driver, etc.) that is configured to interpret the user interactions indicated in signal 2922. Non-touch IM 2912 translates the user interactions to a user feedback indication that is provided to IM manger 2512 as user feedback indication 2932 (in the common message format).

Referring back to FIG. 30, in step 3004, the first preference is enabled to be indicated by a first touch pattern, the second preference is enabled to be indicated by a second touch pattern, and the third preference is enabled to be indicated by a third touch pattern. In an embodiment, display screen 110 may include feedback interface 130 in the form of a touch interface that a user may interact with by touch. The user may be enabled to indicate a preference with respect to displayed content by providing a touch pattern (e.g., provided by one or more fingers). Using corresponding touch patterns, the user may be enabled to select each of the available options, including options such as "No," "More," or "Deep".

As shown in FIG. 29, display screen 110 generates a touch interaction signal 2920 that includes the provided feedback in the form of the interactions with display screen 110 (e.g., touch patterns). Touch IM 2910 may be optionally plugged into IM manager 2512 to interface display screen 110 with IM manager 2512. According to flowchart 2800 (FIG. 28), touch IM 2910 receives and translates touch interaction signal 2920 into a user feedback indication (e.g., "No," "More," or "Deep") in a common message format. For example, touch IM 2910 may include a driver for display screen 110 that is configured to interpret the touch patterns indicated in signal 2920. Touch IM 2910 translates the touch patterns to a user feedback indication that is provided to IM manger 2512 as user feedback indication 2930 (in the common message format).

Referring back to FIG. 30, in step 3006, the first preference is enabled to be indicated by a first gesture, the second preference is enabled to be indicated by a second gesture, and the third preference is enabled to be indicated by a third gesture. In an embodiment, gesture sensor 2904 may be present to enable the user to indicate a preference with respect to displayed content by providing a gesture (e.g., provided by one or both hands, by a face, etc.). Gesture sensor 2904 may be separate from or integrated in display screen 110. Gesture sensor 2904 may include one or more cameras, heat sensors (e.g., an IR sensor), wired gloves, or other gesture sensing mechanism to capture a gesture made by a user, and may use gesture recognition techniques to interpret the gesture. Using corresponding gesture patterns (e.g., by pointing, drawing a shape in the air, using sign language, providing a facial expression, etc.), the user may be enabled to select each of the available options, including options such as "No," "More," or "Deep".

As shown in FIG. 29, gesture sensor 2904 generates a gesture interaction signal 2924 that includes the provided feedback in the form of the interactions with gesture sensor 2904 (e.g., gestures). Gesture IM 2914 may be optionally plugged into IM manager 2512 to interface gesture sensor 2904 with IM manager 2512. According to flowchart 2800 (FIG. 28), gesture IM 2914 receives and translates gesture interaction signal 2924 into a user feedback indication (e.g., "No," "More," or "Deep") in a common message format. For example, gesture IM 2914 may include a driver for gesture sensor 2904 that is configured to interpret the gestures indicated in signal 2924. Gesture IM 2914 translates the gestures to a user feedback indication that is provided to IM manger 2512 as user feedback indication 2934 (in the common message format).

Referring back to FIG. 30, in step 3008, the first preference is enabled to be indicated by a first motion pattern, the second preference is enabled to be indicated by a second motion pattern, and the third preference is enabled to be indicated by a third motion pattern. In an embodiment, motion sensor 2906 may be present to enable the user to indicate a preference with respect to displayed content by providing a motion (e.g., moving an object such as user device 2900). Motion sensor 2906 may include one or more accelerometers, gyroscopes, or other motion sensing mechanism to capture a motion, and may use motion recognition techniques to interpret the motion. Using corresponding motion patterns (e.g., moving the object in a circle, right-left, up-down, or in another direction or series of directions), the user may be enabled to select each of the available options, including options such as "No," "More," or "Deep".

As shown in FIG. 29, motion sensor 2906 generates a motion interaction signal 2926 that includes the provided feedback in the form of the interactions with motion sensor 2906 (e.g., motions). Motion IM 2916 may be optionally plugged into IM manager 2512 to interface motion sensor 2906 with IM manager 2512. According to flowchart 2800 (FIG. 28), motion IM 2916 receives and translates motion interaction signal 2926 into a user feedback indication (e.g., "No," "More," or "Deep") in a common message format. For example, motion IM 2916 may include a driver for motion sensor 2906 that is configured to interpret the motions indicated in signal 2926. Motion IM 2916 translates the motions to a user feedback indication that is provided to IM manger 2512 as user feedback indication 2936 (in the common message format).

Referring back to FIG. 30, in step 3010, the first preference is enabled to be indicated by a first spoken pattern, the second preference is enabled to be indicated by a second spoken pattern, and the third preference is enabled to be indicated by a third spoken pattern. In an embodiment, microphone 2908 may be present as a sound sensor to enable the user to indicate a preference with respect to displayed content by speaking one or more words ("spoken patterns"). Microphone 2908 may include one or more microphones (e.g., a microphone array) to capture voice. Using corresponding spoken patterns (e.g., the words "No," "More," "Deep", etc.), the user may be enabled to select each of the available options, including options such as "No," "More," or "Deep".

As shown in FIG. 29, microphone 2908 generates a voice interaction signal 2928 that includes the provided feedback in the form of the interactions with microphone 2908 (e.g., speech). Voice IM 2918 may be optionally plugged into IM manager 2512 to interface microphone 2908 with IM manager 2512. According to flowchart 2800 (FIG. 28), voice IM 2918 receives and translates voice interaction signal 2928 into a user feedback indication (e.g., "No," "More," or "Deep") (e.g., using speech recognition techniques) in a common message format. For example, voice IM 2918 may include a driver for microphone 2908 that is configured to interpret the speech indicated in signal 2928. Voice IM 2918 translates the speech to a user feedback indication that is provided to IM manger 2512 as user feedback indication 2938 (in the common message format).

As described above with respect to flowchart 2600, registration interface 2704 of IM manager 2512 may register one or more of touch IM 2910, non-touch IM 2912, gesture IM 2914, motion IM 2916, voice IM 2918, and/or further interaction modules. The registered interface module(s) may couple with IM interface 2702. Through IM interface 2702, IM manager 2512 is configured to receive all feedback indications provided by registered interaction modules, such as one or more of user feedback indications 2930, 2932, 2934, 2936, and 2938. As described above, messaging module 2706 of IM manager 2512 is configured to transmit the received user feedback indications to a server (e.g., server 104 of FIG. 1) to have next content selected for display by user device 2900.

III. Example User Device and Server Embodiments

User device 102, server 104, server 500, action interpreter 108, content selector 114, web service 502, decision supporting system 504, machine learning logic 506, decision logic 508, user device 2500, extensible user UI module 2504, interaction module 2508, interaction module 2510, interaction module manager 2512, interaction module interface 2702, registration interface 2704, messaging module 2706, user device 2900, touch IM 2910, non-touch IM 2912, gesture IM 2914, motion IM 2916, voice IM 2918, flowchart 200, flowchart 300, flowchart 600, flowchart 700, flowchart 800, flowchart 900, step 1002, flowchart 2600, flowchart 2800, and flowchart 3000 may be implemented in hardware, or hardware combined with software and/or firmware. For example, action interpreter 108, content selector 114, web service 502, decision supporting system 504, machine learning logic 506, decision logic 508, extensible user UI module 2504, interaction module 2508, interaction module 2510, interaction module manager 2512, interaction module interface 2702, registration interface 2704, messaging module 2706, touch IM 2910, non-touch IM 2912, gesture IM 2914, motion IM 2916, voice IM 2918, flowchart 200, flowchart 300, flowchart 600, flowchart 700, flowchart 800, flowchart 900, step 1002, flowchart 2600, flowchart 2800, and/or flowchart 3000 may be implemented as computer program code/instructions configured to be executed in one or more processors and stored in a computer readable storage medium. Alternatively, action interpreter 108, content selector 114, web service 502, decision supporting system 504, machine learning logic 506, decision logic 508, extensible user UI module 2504, interaction module 2508, interaction module 2510, interaction module manager 2512, interaction module interface 2702, registration interface 2704, messaging module 2706, touch IM 2910, non-touch IM 2912, gesture IM 2914, motion IM 2916, voice IM 2918, flowchart 200, flowchart 300, flowchart 600, flowchart 700, flowchart 800, flowchart 900, step 1002, flowchart 2600, flowchart 2800, and/or flowchart 3000 may be implemented as hardware logic/electrical circuitry.

For instance, in an embodiment, one or more of action interpreter 108, extensible user UI module 2504, interaction module 2508, interaction module 2510, interaction module manager 2512, interaction module interface 2702, registration interface 2704, messaging module 2706, user device 2900, touch IM 2910, non-touch IM 2912, gesture IM 2914, motion IM 2916, voice IM 2918, flowchart 200, flowchart 300, flowchart 2600, flowchart 2800, and/or flowchart 3000 may be implemented together in a system-on-chip (SoC). Similarly, content selector 114, web service 502, decision supporting system 504, machine learning logic 506, decision logic 508, flowchart 600, flowchart 700, flowchart 800, flowchart 900, and/or step 1002 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and optionally embedded firmware to perform its functions.

Figure 31:
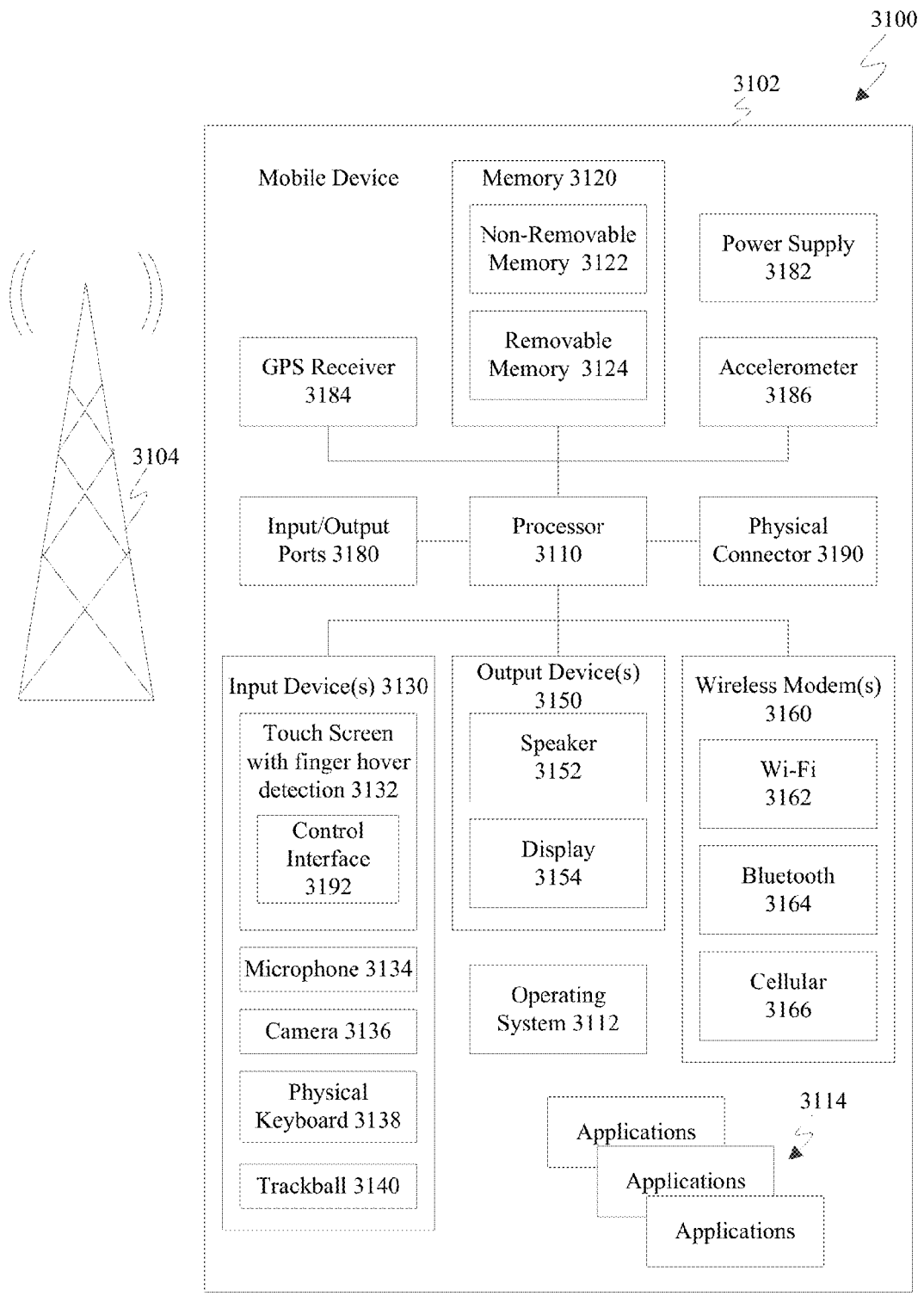
FIG. 31 shows a block diagram of an exemplary user device in which embodiments may be implemented.

FIG. 31 shows a block diagram of an exemplary mobile device 3100 including a variety of optional hardware and software components, shown generally as components 3102. For instance, components 3102 of mobile device 3100 are examples of components that may be included in user device 102 (FIG. 1), user device 2500 (FIG. 25), and user device 2900 (FIG. 29) in mobile device embodiments, but are not shown in the respective figures for ease of illustration. Any number and combination of the features/elements of components 3102 may be included in a mobile device embodiment, as well as additional and/or alternative features/elements, as would be known to persons skilled in the relevant art(s). It is noted that any of components 3102 can communicate with any other of components 3102, although not all connections are shown, for ease of illustration. Mobile device 3100 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 3104, such as a cellular or satellite network, or with a local area or wide area network.

The illustrated mobile device 3100 can include a controller or processor 3110 (e.g., signal processor, microprocessor, ASIC, or other control and processing logic circuitry) for performing such tasks as signal coding, data processing, input/output processing, power control, and/or other functions. An operating system 3112 can control the allocation and usage of the components 3102 and support for one or more application programs 3114 (a.k.a. applications, "apps", etc.). Application programs 3114 can include common mobile computing applications (e.g., email applications, calendars, contact managers, web browsers, messaging applications) and any other computing applications (e.g., word processing applications, mapping applications, media player applications).

As illustrated, mobile device 3100 can include memory 3120. Memory 3120 can include non-removable memory 3122 and/or removable memory 3124. The non-removable memory 3122 can include RAM, ROM, flash memory, a hard disk, or other well-known memory storage technologies. The removable memory 3124 can include flash memory or a Subscriber Identity Module (SIM) card, which is well known in GSM communication systems, or other well-known memory storage technologies, such as "smart cards." The memory 3120 can be used for storing data and/or code for running the operating system 3112 and the applications 3114. Example data can include web pages, text, images, sound files, video data, or other data sets to be sent to and/or received from one or more network servers or other devices via one or more wired or wireless networks. Memory 3120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of program modules may be stored in memory 3120. These programs include operating system 3112, one or more application programs 3114, and other program modules and program data. Examples of such application programs or program modules may include, for example, computer program logic (e.g., computer program code or instructions) for implementing user device 102, action interpreter 108, user device 2500, extensible user UI module 2504, interaction module 2508, interaction module 2510, interaction module manager 2512, interaction module interface 2702, registration interface 2704, messaging module 2706, user device 2900, touch IM 2910, non-touch IM 2912, gesture IM 2914, motion IM 2916, voice IM 2918, flowchart 200, flowchart 300, flowchart 2600, flowchart 2800, and/or flowchart 3000 (including any step of flowcharts 200, 300, 2600, 2800, and 3000) and/or further embodiments described herein.

Mobile device 3100 can support one or more input devices 3130, such as a touch screen 3132, microphone 3134, camera 3136, physical keyboard 3138 and/or trackball 3140 and one or more output devices 3150, such as a speaker 3152 and a display 3154. Touch screens, such as touch screen 3132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 3132 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 3132 is shown to include a control interface 3192 for illustrative purposes. The control interface 3192 is configured to control content associated with a virtual element that is displayed on the touch screen 3132. In an example embodiment, the control interface 3192 is configured to control content that is provided by one or more of applications 3114. For instance, when a user of the mobile device 3100 utilizes an application, the control interface 3192 may be presented to the user on touch screen 3132 to enable the user to access controls that control such content. Presentation of the control interface 3192 may be based on (e.g., triggered by) detection of a motion within a designated distance from the touch screen 3132 or absence of such motion. Example embodiments for causing a control interface (e.g., control interface 3192) to be presented on a touch screen (e.g., touch screen 3132) based on a motion or absence thereof are described in greater detail below.

Other possible output devices (not shown) can include piezoelectric or other haptic output devices. Some devices can serve more than one input/output function. For example, touch screen 3132 and display 3154 can be combined in a single input/output device. The input devices 3130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 3112 or applications 3114 can comprise speech-recognition software as part of a voice control interface that allows a user to operate the device 3100 via voice commands. Further, the device 3100 can comprise input devices and software that allows for user interaction via a user's spatial gestures, such as detecting and interpreting gestures to provide input to a gaming application.

Wireless modem(s) 3160 can be coupled to antenna(s) (not shown) and can support two-way communications between the processor 3110 and external devices, as is well understood in the art. The modem(s) 3160 are shown generically and can include a cellular modem 3166 for communicating with the mobile communication network 3104 and/or other radio-based modems (e.g., Bluetooth 3164 and/or Wi-Fi 3162). Cellular modem 3166 may be configured to enable phone calls (and optionally transmit data) according to any suitable communication standard or technology, such as GSM, 3G, 4G, 5G, etc. At least one of the wireless modem(s) 3160 is typically configured for communication with one or more cellular networks, such as a GSM network for data and voice communications within a single cellular network, between cellular networks, or between the mobile device and a public switched telephone network (PSTN).

Mobile device 3100 can further include at least one input/output port 3180, a power supply 3182, a satellite navigation system receiver 3184, such as a Global Positioning System (GPS) receiver, an accelerometer 3186, and/or a physical connector 3190, which can be a USB port, IEEE 1394 (FireWire) port, and/or RS-232 port. The illustrated components 3102 are not required or all-inclusive, as any components can be not present and other components can be additionally present as would be recognized by one skilled in the art.

Figure 32:
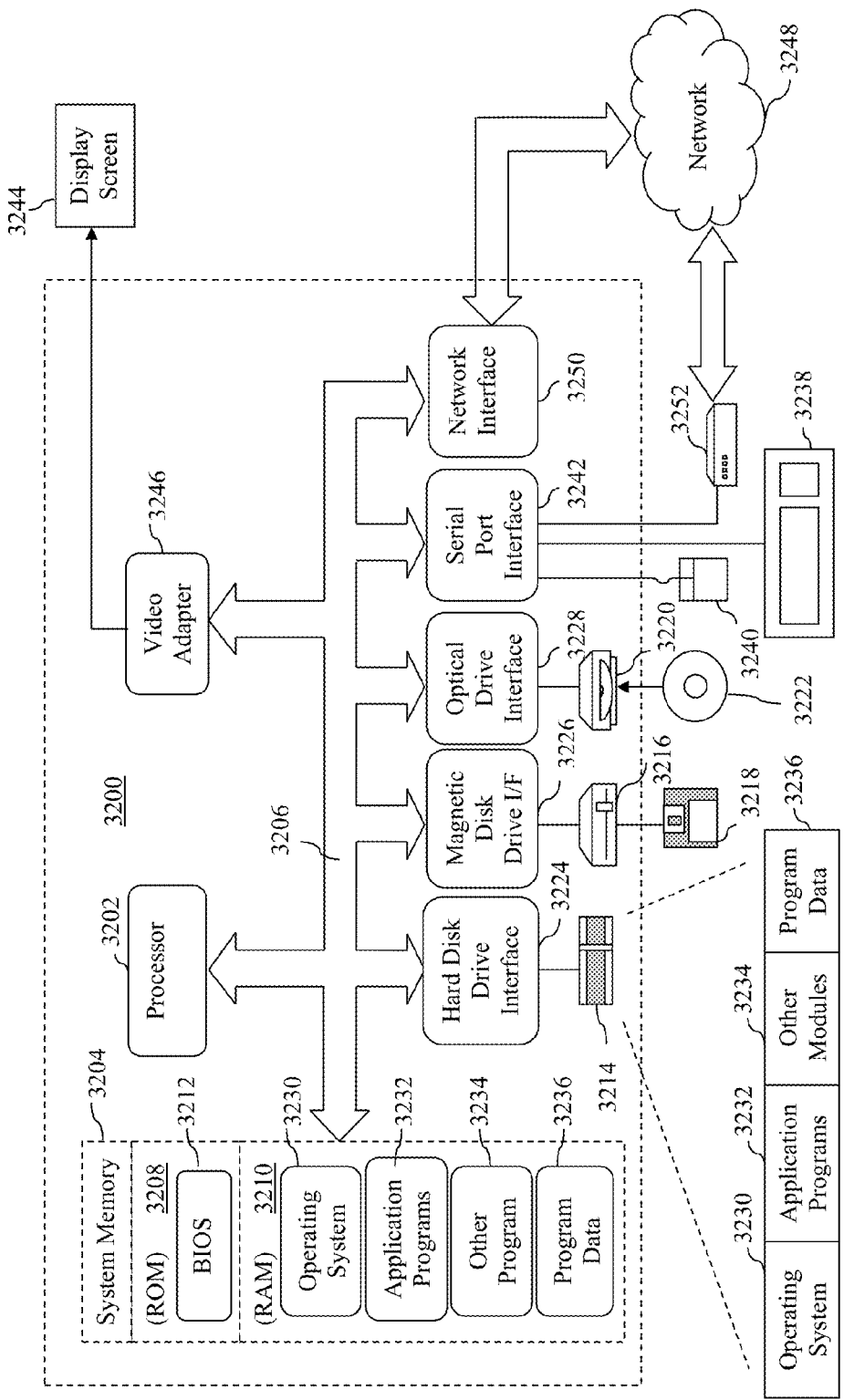
FIG. 32 shows a block diagram of an example computing device that may be used to implement embodiments.

Furthermore, FIG. 32 depicts an exemplary implementation of a computing device 3200 in which embodiments may be implemented. For example, user device 102, user device 2500, user device 2900, server 104, or server 500 may be implemented in one or more computing devices similar to computing device 3200 in stationary computer embodiments, including one or more features of computing device 3200 and/or alternative features. The description of computing device 3200 provided herein is provided for purposes of illustration, and is not intended to be limiting. Embodiments may be implemented in further types of computer systems, as would be known to persons skilled in the relevant art(s).

As shown in FIG. 32, computing device 3200 includes one or more processors 3202, a system memory 3204, and a bus 3206 that couples various system components including system memory 3204 to processor 3202. Bus 3206 represents one or more of any of several types of bus structures, including a memory bus or memory controller, a peripheral bus, an accelerated graphics port, and a processor or local bus using any of a variety of bus architectures. System memory 3204 includes read only memory (ROM) 3208 and random access memory (RAM) 3210. A basic input/output system 3212 (BIOS) is stored in ROM 3208.

Computing device 3200 also has one or more of the following drives: a hard disk drive 3214 for reading from and writing to a hard disk, a magnetic disk drive 3216 for reading from or writing to a removable magnetic disk 3218, and an optical disk drive 3220 for reading from or writing to a removable optical disk 3222 such as a CD ROM, DVD ROM, or other optical media. Hard disk drive 3214, magnetic disk drive 3216, and optical disk drive 3220 are connected to bus 3206 by a hard disk drive interface 3224, a magnetic disk drive interface 3226, and an optical drive interface 3228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 3230, one or more application programs 3232, other program modules 3234, and program data 3236. Application programs 3232 or program modules 3234 may include, for example, computer program logic (e.g., computer program code or instructions) for implementing user device 102, server 104, server 500, action interpreter 108, content selector 114, web service 502, decision supporting system 504, machine learning logic 506, decision logic 508, user device 2500, extensible user UI module 2504, interaction module 2508, interaction module 2510, interaction module manager 2512, interaction module interface 2702, registration interface 2704, messaging module 2706, user device 2900, touch IM 2910, non-touch IM 2912, gesture IM 2914, motion IM 2916, voice IM 2918, flowchart 200, flowchart 300, flowchart 600, flowchart 700, flowchart 800, flowchart 900, step 1002, flowchart 2600, flowchart 2800, and/or flowchart 3000 (including any step of flowcharts 200, 300, 600, 700, 800, 900, 2600, 2800, and 3000), and/or further embodiments described herein.

A user may enter commands and information into the computing device 3200 through input devices such as keyboard 3238 and pointing device 3240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 3202 through a serial port interface 3242 that is coupled to bus 3206, but may be connected by other interfaces, such as a parallel port, game port, or a universal serial bus (USB).

A display screen 3244 is also connected to bus 3206 via an interface, such as a video adapter 3246. Display screen 3244 may be external to, or incorporated in computing device 3200. Display screen 3244 may display information, as well as being a user interface for receiving user commands and/or other information (e.g., by touch, finger gestures, virtual keyboard, etc.). In addition to display screen 3244, computing device 3200 may include other peripheral output devices (not shown) such as speakers and printers.

Computing device 3200 is connected to a network 3248 (e.g., the Internet) through an adaptor or network interface 3250, a modem 3252, or other means for establishing communications over the network. Modem 3252, which may be internal or external, may be connected to bus 3206 via serial port interface 3242, as shown in FIG. 32, or may be connected to bus 3206 using another interface type, including a parallel interface.

As used herein, the terms "computer program medium," "computer-readable medium," and "computer-readable storage medium" are used to generally refer to media such as the hard disk associated with hard disk drive 3214, removable magnetic disk 3218, removable optical disk 3222, memory 3120 (including non-removable memory 3122 and removable memory 3124), flash memory cards, digital video disks, RAMs, ROMs, and further types of physical/tangible storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 3232 and other program modules 3234) may be stored on the hard disk, magnetic disk, optical disk, ROM, or RAM. Such computer programs may also be received via network interface 3250, serial port interface 3242, or any other interface type. Such computer programs, when executed or loaded by an application, enable computing device 3200 to implement features of embodiments discussed herein. Accordingly, such computer programs represent controllers of the computing device 3200.

As such, embodiments are also directed to computer program products comprising computer instructions/code stored on any computer useable storage medium. Such code/instructions, when executed in one or more data processing devices, causes a data processing device(s) to operate as described herein. Examples of computer-readable storage devices that may include computer readable storage media include storage devices such as RAM, hard drives, floppy disk drives, CD ROM drives, DVD ROM drives, zip disk drives, tape drives, magnetic storage device drives, optical storage device drives, MEMs devices, nanotechnology-based storage devices, and further types of physical/tangible computer readable storage devices.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A user device, comprising:
    an extensible user interface (UI) module that includes
        an interaction module manager that includes
            an interaction module interface configured to couple with a plurality of interaction modules, each coupled interaction module configured to enable a corresponding content interaction technique via a corresponding user input device, each content interaction technique enabling a user to provide an interaction signal via the corresponding user input device, each coupled interaction module further configured to receive the corresponding interaction signal from the corresponding user input device, to translate the interaction signal to a user feedback indication, and to provide the user feedback indication to the interaction module manager through the interaction module interface according to a common message format,
            a registration interface configured to enable the interaction modules to each register with the interaction module manager, and
            a messaging module configured to generate a user data package for each user feedback indication to transmit to a server.

2. The user device of claim 1, wherein the extensible user interface (UI) module further comprises:
    an interaction module coupled with the interaction module manager through the interaction module interface.

3. The user device of claim 2, wherein the interaction module is configured to enable content feedback in association with content displayed by the user device, the interaction module configured to enable a first preference to be indicated that the displayed content is not preferred and that replacement content be displayed, to enable a second preference to be indicated that the displayed content is preferred and that additional content similar to the displayed content be displayed, and to enable a third preference to be indicated that the displayed content is preferred and that additional content providing additional information about the displayed content be displayed.

4. The user device of claim 3, wherein the interaction module is a non-touch interaction module, the interaction module configured to display a first graphical user interface (GUI) element that includes a first option that may be interacted with to indicate the first preference, to display a second GUI element that includes a second option that may be interacted with to indicate the second preference, and to display a third GUI element that includes a third option that may be interacted with to indicate the third preference.

5. The user device of claim 3, wherein the interaction module is a touch interaction module, the interaction module configured to enable the first preference to be indicated by a first touch pattern, to enable the second preference to be indicated by a second touch pattern, and the third preference to be indicated by a third touch pattern.

6. The user device of claim 3, wherein the interaction module is a gesture interaction module, the interaction module configured to enable the first preference to be indicated by a first gesture, the second preference to be indicated by a second gesture, and the third preference to be indicated by a third gesture.

7. The user device of claim 3, wherein the interaction module is a motion sensing interaction module, the interaction module configured to enable the first preference to be indicated by a first motion pattern, the second preference to be indicated by a second motion pattern, and the third preference to be indicated by a third motion pattern.

8. The user device of claim 3, wherein the interaction module is a voice interaction module, the interaction module configured to enable the first preference to be indicated by a first spoken pattern, the second preference to be indicated by a second spoken pattern, and the third preference to be indicated by a third spoken pattern.

9. The user device of claim 1, wherein the registration module is configured to, each time the interaction module manager is initialized, request each coupled interaction module to provide a health status of the corresponding user input device.

10. The user device of claim 9, wherein the registration module is configured to enable all coupled interaction modules that provide a healthy health status to accept user interaction.

11. The user device of claim 1, wherein the extensible user interface (UI) module further comprises:
a first interaction module coupled with the interaction module manager through the interaction module interface, the first interaction module configured to enable content feedback in association with content displayed by the user device according to a first content interaction technique;
a second interaction module coupled with the interaction module manager through the interaction module interface, the second interaction module configured to enable content feedback in association with content displayed by the user device according to a second content interaction technique that is different from the first content interaction technique;
a third interaction module coupled with the interaction module manager through the interaction module interface, the third interaction module configured to enable content feedback in association with content displayed by the user device according to a third content interaction technique that is different from the first content interaction technique and from the second content interaction technique;
the first interaction module receiving first content feedback in association with first content displayed by the user device indicating that the first content be replaced with a display of a replacement content;
the second interaction module receiving second content feedback in association with second content displayed by the user device indicating that additional content similar to the second content be displayed; and
the third interaction module receiving third content feedback in association with third content displayed by the user device indicating that additional content providing additional information about the third content be displayed.

12. The user device of claim 1, wherein the extensible UI module further includes:
a download module that enables an interaction module to be downloaded and installed on the user device to enable an additional content interaction technique.

13. A method in a user device, comprising:
providing an interaction module interface that enables a plurality of interaction modules to couple with an interaction module manager, each coupled interaction module configured to enable a corresponding content interaction technique via a corresponding user input device, each content interaction technique enabling a user to provide an interaction signal via the corresponding user input device, each coupled interaction module configured to receive the interaction signal from the corresponding user input device, to translate the interaction signal to a user feedback indication, and to provide the user feedback indication through the interaction module interface according to a common message format,
enabling the interaction modules to each register with the interaction module manager, and
generating a user data package for each user feedback indication to transmit to a server.

14. The method of claim 13, further comprising:
receiving an interaction module that couples with the interaction module manager;
enabling, by the coupled interaction module, content feedback in association with content displayed at the user device including
enabling an indication of a first preference to be provided by a user interacting with the displayed content that indicates that the displayed content be replaced with a display of a replacement content,
enabling an indication of a second preference to be provided by the user interacting with the displayed content that indicates that additional content regarding a same topic as the displayed content be displayed, and
enabling an indication of a third preference to be provided by the user interacting with the displayed content that indicates that additional content providing additional information about the displayed content be displayed.

15. The method of claim 14, wherein said enabling content feedback in association with the displayed content comprises at least one of:
displaying a graphical user interface element that includes a first option that may be interacted with to indicate the first preference, a second option that may be interacted with to indicate the second preference, and a third option that may be interacted with to indicate the third preference;
enabling the first preference to be indicated by a first touch pattern, the second preference to be indicated by a second touch pattern, and the third preference to be indicated by a third touch pattern;
enabling the first preference to be indicated by a first gesture, the second preference to be indicated by a second gesture, and the third preference to be indicated by a third gesture;
enabling the first preference to be indicated by a first motion pattern, the second preference to be indicated by a second motion pattern, and the third preference to be indicated by a third motion pattern; or
enabling the first preference to be indicated by a first spoken pattern, the second preference to be indicated by a second spoken pattern, and the third preference to be indicated by a third spoken pattern.

16. The method of claim 14, further comprising:
during registration, requesting each coupled interaction module to provide a health status of the user input device; and enabling coupled interaction modules that provide a healthy health status to accept user interaction.

17. The method of claim 13, further comprising:
enabling an interaction module to be downloaded and installed on the user device to enable an additional content interaction technique.

18. A computer-readable storage medium comprising computer-executable instructions that, when executed by a processor, perform a method comprising:
providing an interaction module interface that enables a plurality of interaction modules to couple with an interaction module manager in a user device, each coupled interaction module configured to enable a corresponding content interaction technique via a corresponding user input device, each content interaction technique enabling a user to provide an interaction signal via the corresponding user input device, each coupled interaction module further configured, to receive an interaction signal from the corresponding user input device, to translate the interaction signal to a user feedback indication, and to provide the user feedback indication through the interaction module interface according to a common message format,
enabling the interaction modules to each register with the interaction module manager, and
generating a user data package for each user feedback indication to transmit from the user device to a server.

19. The computer-readable storage medium of claim 18, the method further comprising:
receiving an interaction module that couples with the interaction module manager;
enabling, by the coupled interaction module, content feedback in association with content displayed at the user device including
enabling an indication of a first preference to be provided by a user interacting with the displayed content that indicates that the displayed content be replaced with a display of a replacement content,
enabling an indication of a second preference to be provided by the user interacting with the displayed content that indicates that additional content regarding a same topic as the displayed content be displayed, and
enabling an indication of a third preference to be provided by the user interacting with the displayed content that indicates that additional content providing additional information about the displayed content be displayed.

20. The computer-readable storage medium of claim 19, wherein said enabling, by the coupled interaction module, content feedback in association with the displayed content comprises at least one of:
displaying a graphical user interface element that includes a first option that may be interacted with to indicate the first preference, a second option that may be interacted with to indicate the second preference, and a third option that may be interacted with to indicate the third preference;
enabling the first preference to be indicated by a first touch pattern, the second preference to be indicated by a second touch pattern, and the third preference to be indicated by a third touch pattern;
enabling the first preference to be indicated by a first gesture, the second preference to be indicated by a second gesture, and the third preference to be indicated by a third gesture;
enabling the first preference to be indicated by a first motion pattern, the second preference to be indicated by a second motion pattern, and the third preference to be indicated by a third motion pattern; or
enabling the first preference to be indicated by a first spoken pattern, the second preference to be indicated by a second spoken pattern, and the third preference to be indicated by a third spoken pattern.

* * * * *